(12) United States Patent
Au

(10) Patent No.: US 11,683,443 B2
(45) Date of Patent: Jun. 20, 2023

(54) METHODS TO IMPROVE PERSON-TO-PERSON INTERACTIONS IN VIDEO CONFERENCES

(71) Applicant: Lawrence Au, Vienna, VA (US)

(72) Inventor: Lawrence Au, Vienna, VA (US)

( * ) Notice: Subject to any disclaimer, the term of this patent is extended or adjusted under 35 U.S.C. 154(b) by 0 days.

(21) Appl. No.: 17/467,433

(22) Filed: Sep. 6, 2021

(65) Prior Publication Data

US 2022/0078374 A1 Mar. 10, 2022

Related U.S. Application Data

(60) Provisional application No. 63/075,215, filed on Sep. 7, 2020.

(51) Int. Cl.
*H04N 7/15* (2006.01)
*H04L 12/18* (2006.01)
*G06F 3/04817* (2022.01)
*G06F 3/04842* (2022.01)
*G06F 3/0486* (2013.01)

(52) U.S. Cl.
CPC ............. *H04N 7/15* (2013.01); *G06F 3/0486* (2013.01); *G06F 3/04817* (2013.01); *G06F 3/04842* (2013.01); *H04L 12/1822* (2013.01)

(58) Field of Classification Search
CPC ............... G06F 3/0486; G06F 3/04817; G06F 3/04842; H04N 7/15; H04L 12/1822; H04M 3/568; H04M 2201/50

USPC ........................................... 348/14.01–14.16
See application file for complete search history.

(56) References Cited

U.S. PATENT DOCUMENTS

| 10,491,579 | B2* | 11/2019 | Yoakum | H04L 65/4015 |
| 2009/0040289 | A1* | 2/2009 | Hetherington | H04L 65/403 |
| | | | | 348/E7.078 |
| 2012/0017149 | A1* | 1/2012 | Lai | H04L 65/403 |
| | | | | 715/758 |
| 2014/0267550 | A1* | 9/2014 | Nimri | H04N 7/152 |
| | | | | 348/14.09 |
| 2020/0014792 | A1* | 1/2020 | Lyren | H04S 7/304 |
| 2021/0352244 | A1* | 11/2021 | Benedetto | H04N 7/15 |

FOREIGN PATENT DOCUMENTS

RU 2642352 C2 * 1/2018 ......... H04L 65/1089

* cited by examiner

*Primary Examiner* — Melur Ramakrishnaiah

(57) ABSTRACT

The present invention provides significant and much needed improvements in person-to-person interactions within videoconferencing events, by enabling each participant a greater freedom the move around quickly, and change their acoustic perspectives based on their relative positions to other participants, to control who is near to them, and to quickly scan through all participants in a venue to choose participants they like and later to see who liked them. Recent advances in processing power and simulation of binaural sound from monophonic sound simulates distances and azimuth angles as well as aural anatomical comb filtering effects to simulated stereophonic sound and select desirable crowd noises in videoconferencing.

11 Claims, 22 Drawing Sheets

Examples Of Dragging Onto Participant To Privately Talk To Them dotted circle around Bob is the comfort zone around Bob he can control in overview.

Drag and Drop UI Showing Participant Attendee
Avatar Tiles and Sound Barrier Objects and
Video Barrier Object Example Of Drag and Drop UI Showing
Performing Attendees On Stage Area and
Audience Attendees Offstage Example Of Rearranged Breakout Rooms and Roving Microphone Example Of Dragging Breakout Room
Boundaries To Release Participants

Examples Of Dragging Onto Participant To Privately Talk To Them dotted circle around Bob is the comfort zone around Bob he can control in overview.

Method Of Simulating Binaural Sound Transmission From Stage Microphone To Audience

Method Of Displaying Waiting Room Tiles to Host Moderator Or Panelist

Example Of Displaying Overlapping Tiles In Crowded Overviews

Example Of Displaying Overlapping Tiles In Less Crowded Overviews

Example Of Displaying Overlapping Tiles In A Packed Venue

METHODS TO IMPROVE PERSON-TO-PERSON INTERACTIONS IN VIDEO CONFERENCES

RELATED APPLICATIONS

This patent application claims priority to the U.S. provisional patent application 63/075,215 filed on 7 Sep. 2020 by Au, titled "Methods To Provide Physical Venue Advantages To Video Conferences" which is hereby incorporated by reference, in its entirety.

BACKGROUND OF THE INVENTION

Person-to-person interactions in physical meeting rooms, classrooms, theaters and ballrooms have distinct advantages as venues over video conferencing via applications such as Zoom, Webex and GotoMeeting. With so many schools and businesses of the world now meeting in video conferencing instead of gathering in person, and because of worldwide pandemic, and to meet with people too far away to travel to, it is especially urgent to consider how key person-to-person interactions can be more efficient in video conferencing applications.

These key advantages arise both from useful sensory inputs and the ability to move around in physical space to focus and control how sensory details affect gatherings. For instance, a teacher in an elementary school classroom can easily divide a class into study groups and then walk around the classroom from group to group to monitor progress. In another example, a panel of experts on a stage can jointly deliver a presentation to an audience of hundreds of audience members, until an audience member raises their hand to interrupt. With permission from a moderator or panelist, the audience member can then walk to the stage and via a lectern microphone, address their question to the whole conference and receive an answer from panelists on microphones. In still another example, people wanting admission to an event may have their credentials screened in a foyer, in a private conversation, before being admitted to a seat appropriate to their category of credentials.

In all of the above examples of credentials, movements about a physical meeting space change the acoustics and visual relationships between participants. These various shifts in acoustic and visual experiences enable teachers to better construct the learning environment in class rooms, and allow event hosts to better focus events on interesting or important topics and interactions. Often venues have an architecture and decor and acoustics designed to improve person-to-person interactions. For instance, a classroom is often large enough to have break-out spaces inside of it, while also being small enough for a single teacher to manage. A theatre or lecture hall often provides a stage to create a physical separation between audience and presenters, so that presenters are easier to see and hear and presenters control a podium with a microphone. Sitting closer or farther away from someone changes the likelihood of interaction with them, so tickets are sold at a premium for seats closer in. Sitting closer together or farther apart can be adjusted by simply getting up and sitting in a different location in a venue, subject to ushers who check for tickets, unlike prior art video conferences where the audio feed from all participants is mixed equally and distributed as a single monophonic outbound feed to the ears of participants. Prior art oversimplification of venue acoustics makes online events more confusing by stripping away audio cues which localize voices to their sitting locations in physical event spaces. Prior art oversimplifications also make it harder for teachers and event hosts to pinpoint who is speaking, and also make it harder to acoustically separate participants who need to talk to each other privately.

Prior art video conferencing user interface design is dominated by simple rectangular tiling of one avatar tile icon per participant, and beyond background changes there is a lack of useful venue specific design elements, both acoustic and visual. Prior art efforts to upgrade this design have focused mainly on complex virtual reality enhancements, both in auditory and visual dimensions. In virtual reality setups, navigation commands are via joystick, helmet tilt sensors or eyeball movement sensors. Unfortunately, these devices complicate the user interface, especially when attempting to move within with 3-dimensional spaces, making it more tedious to perform simple movements such as crossing a crowded room to find someone blocked by obstacles, than it would be in a real venue.

Complexity severely constrains the utility of video-conference software. Zoom simplified their user interface, especially regarding login and security, and consequently gained market share at the expense of all other competitors. Video conference attendees have little or no inclination to deal with complex user interfaces and even experiences hosts find these interfaces difficult. Teachers, for instance, sometime use a teaching assistant to run a classroom with twenty students, just because the complexity of correctly muting and unmuting students in real time is so difficult to handle while teaching.

At the same time, virtual reality systems have attracted the majority of user-interface enhancement investments, teaching a belief that the future of user interfaces belongs to 3D virtual reality systems. Unfortunately, this faith in 3D solutions can stand in the way of better human-to-human interactions in videoconferencing, because of the complexities mentioned above.

SUMMARY OF THE INVENTION

Breaking free of the conventional engineering designs directly imitating real 3D venues, the present invention reduces the dimensionality of a videoconference to focus on the most important person-to-person interactions into a cartoon-like 2D interface where person-to-person interactions are supported with the easily used 2D drag and drop interfaces. Although dragging and dropping avatar icon tiles of attendees around a venue violates laws of physics, this enables attendee participants to pop directly to destinations as if they are flying with no inertia, so participants can thus move faster than they could move in a real venue, with very high accuracy by guiding their movements on-screen through well-known touchscreen or trackpad gestures. For instance, In a real venue, it would take ten seconds to traverse a forty foot room to talk to a specific person, requiring traversing any obstacles such as other people which may be in the way. Dragging and dropping one's avatar on the avatar of that specific person can easily be done in half a second, and no obstacles will block the way. This twenty-fold speedup makes human-to-human interactions in a cartoon-like venue more convenient than a real venue, and more convenient than virtual reality venues which copy the inconveniences of 3d space such as limited overviews of venues, and obstructed sight-lines.

The present invention also uses carefully optimized user interface controls added to an overview of a venue, so that conferencing attendee participants can more efficiently accomplish the most important tasks of interacting with people: choosing when and for how long to interact with other specific participants, and choosing when and for how long to pay attention to specific auditory feeds within the conference, all the while relying on a stable, shared common view of what's going on. The cartoon-like appearance of the present invention is thus more powerful for main videoconferencing use cases than prior art systems, despite its 2D controls which were popularized by 2D drawing programs but not popular in 3D virtual reality interfaces. Despite the lack of attention-getting 3D features, these 2D drag and drop controls make choosing when and for how long to interact with other specific participants, and choosing when and for how long to tune into specific auditory feeds a much faster and easier task than in 3D spaces.

The present invention also optionally uses simulated stereophonic placement of videoconference participants in a synthesized acoustic venue. Calculation of simulated aural phase shift delays as well as volume decreases which vary by frequency, as they do in physical venues when participants are located two to 100 feet away from each other. These simulated aspects of familiar natural acoustic effects enable participants to know who is speaking by the stereo image presented to them. For instance, when seated all in a row of tiles at the top of the screen, sound from a speaker to their left arrives in their left ear sooner then their right ear, but sound from a speaker to the right arrives in the right ear sooner than their left ear. In another dimension of acoustics, sound from two feet away conveys more high frequency content than sound from 20 feet away, and much more than sound from 100 feet away. Lower frequencies travel across distances better than higher frequencies. Consequently, most people's ears can estimate a distance to a speaker by the relative degree of muffling at higher frequencies. When simulating this by using audio processing, the present invention can help participants to localize sound coming from other participants. For instance, in a tiled row of 10 participants, this simulated sound processing would alter sound traveling from the leftmost to the rightmost participant to have perceptible roll off of high frequency content compared to sound traveling from leftmost to adjacent participant. Greater simulated distances also result in greater reduction in volume of sound traveling from participant to participant.

Recent increases in processor power enable laptop-class processors to simulate binaural acoustics using digital sound processing software. This kind of software, for example the "3D Tune-in Toolkit" enables simulation of the comb filter effects of sound passing across a person's face around their head and through their aural canals, to localize sounds around them.

As owners of concert halls and other music venues know, venue acoustics play an important part in the value of a performances. An overly acoustically damped venue is boring to hear and a somewhat reflective venue is more exciting, but too much reflection can make a venue sound harshly distorted. The present invention provides controls to adjust room tone to suit a variety of performances and gatherings, so that hosts can choose the proper balance of reflection and damping in acoustics for the size and style of event.

The present invention allows participants to drag the avatar tile which presents their video image to a preferred location in the simulated venue, to sit near people with which they want to have semi-private conversation with, or to get their attention more quickly in private conversations by dragging their avatar icon tile on top of the avatar icon tile of the participant they want to have a private conversation with. To better control of sound propagation in physical event spaces, which may have separate break-out rooms and stage or podium microphones, the present invention provides drag and drop objects to control acoustics, such as acoustic barrier boxes and one-way acoustic barrier areas. One-way acoustic barrier areas prevent sound from traveling in one direction, but allow it from the other direction. For instance, a physical presentation given by five panelists on a stage with a stereo microphone set amid them would acoustically dominate anyone in the audience. In a video conference, a stage area around all the panelists and an icon for the stereo microphone prevents any of audience participation sounds from reaching the microphone, which when used in this context can be a sole source of simulated sound for all participants. When a participant wishes to address the panelists, they can drag their avatar tile into the stage around the panelists, and when it lands in that stage they become audible to the microphone. The moderator can override this by dragging this participant avatar tile back out to where it came from. This provides a considerably clearer visual confirmation of the acoustic settings than the multiplicity of individual mute buttons which are combined in the prior art, as well as faster confirmation of security controls which may be needed for large-scale events where participants may not know each other. Together they greatly reduce the labor content of hosting an event, for instance, by eliminating the need to have an assistant help run a classroom videoconference just to keep track of mute buttons.

Since the present invention has user interface barrier boxes to control which tiles can send sound to which tiles, other kinds of barrier boxes can also control which tiles can transmit video to the others. This is especially useful for creating waiting areas where the credentials of participants can be discussed and categorized before seating them in a seat for their category in the audience and allowing their tile to appear visible to audience members. Those paying for premium seats may be seated closer to the performers, so they can interact more strongly with them in acoustics.

Another advantage supported by the present invention is the ability of participants to approach closer to one another, to participate in near-field conversation. When one participant drags their close to another participant's tile, their volume transmission is maximal at all frequencies. If two or more do this, the competition to get closer creates a ring of tiles around the popular participant. If the popular participant dislikes this attention they can drag the tiles back to a comfortable default backoff distance; security controls prioritize a participant's zone of comfort in these cases. In really large venues with hundreds of participants, these participant enforced zones of comfort may be necessary to prevent micro-aggressions.

DESCRIPTION OF THE INVENTION

Figure 20:
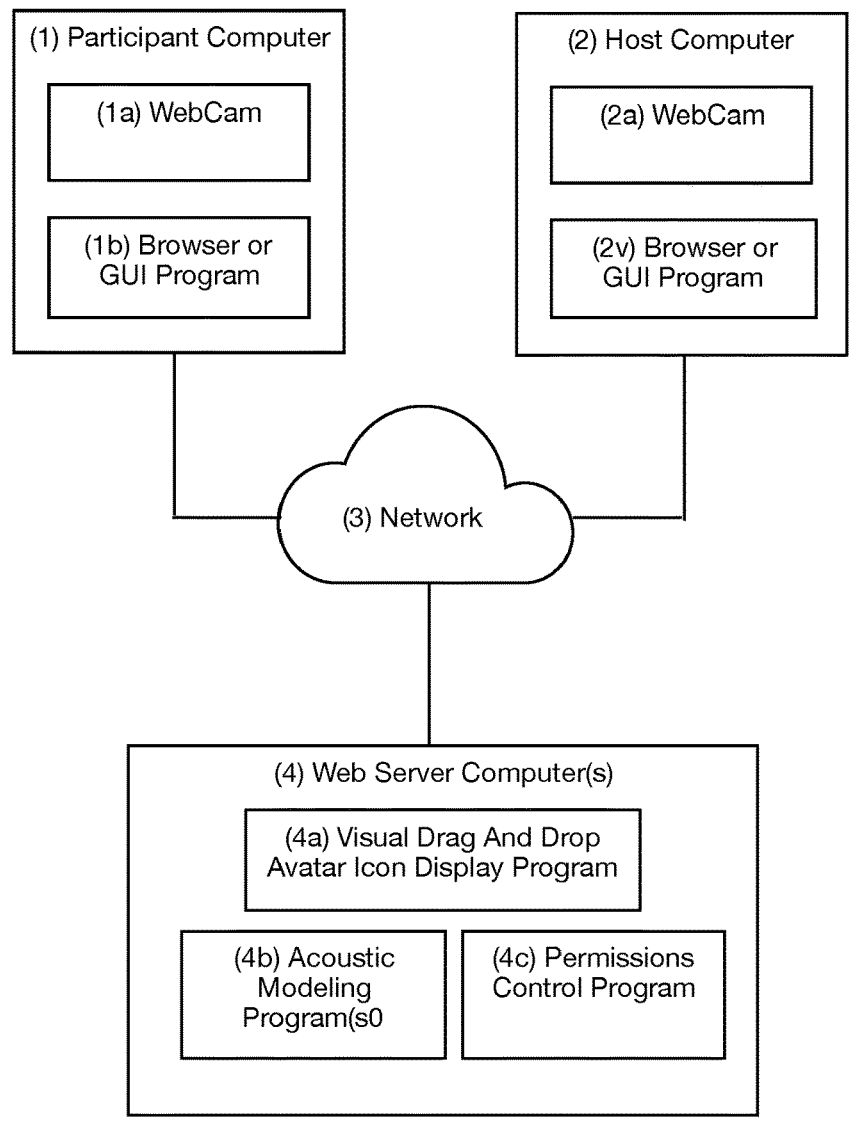
FIG. 20 shows a System And Method Of Computer Enabled Videoconferencing For Improved Person-to-Person Interactions.

FIG. 20 shows some of the computer hardware which may support the present invention, with lines showing how they communicate over a network, such as the Internet. (1) Participant Computer and (2) Host Computers are usually equipped with a WebCam and a Web browser or other computer program which send video feeds over the (3) Network to (4) Web Server Computer(s), which for greater bandwidth is often a bank of clustered computers. In the (4) Web Server Computer(s) are programs to serve elements of the (4a) Visual Drag And Drop Icon Display Program, so participants can see and hear each other, as well as choose new locations in the video conference venue, and in the case of Host participants, to control who is admitted to the video conference as well as control their locations within the conference as needed.

Figure 11:
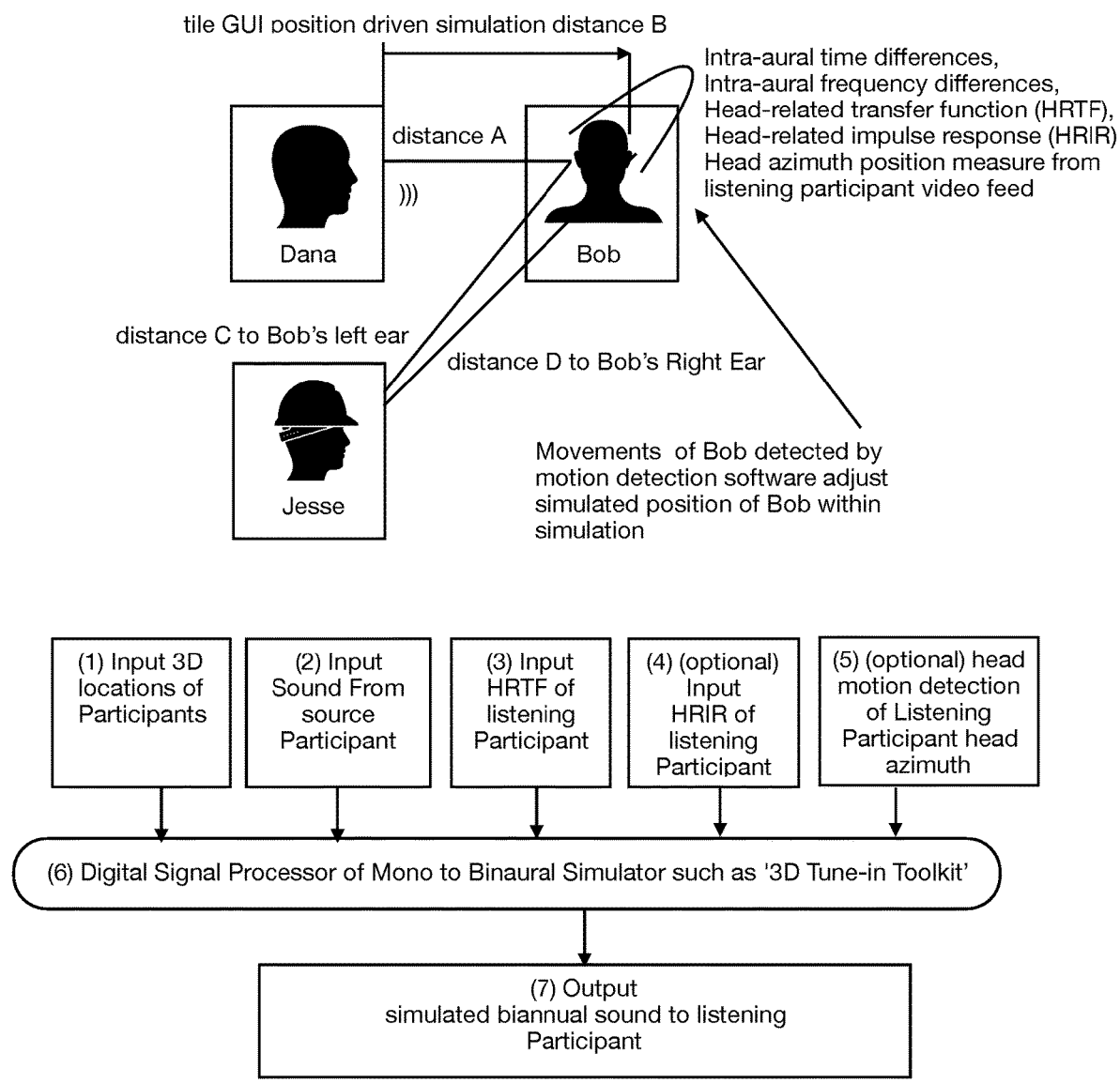
FIG. 11 shows a Method Of Simulating Binaural Sound Transmission Between Participants.

Additional programs running in the (4) Web Server Computer(s) may include (4b) Acoustic Modeling Program(s) to simulate distances between participants, and may also simulate binaural hearing to localize the position of participants using the method of FIG. 11.

Other additional programs running in the (4) Web Server Computer(s) may include (4c) Permissions Control Programs which compute which participants may control the drag and drop commands of other participants, for instance when Host participants override the actions of other participants, or a participant drags another participant out of their comfort perimeter, to avoid harassment.

Figure 1:
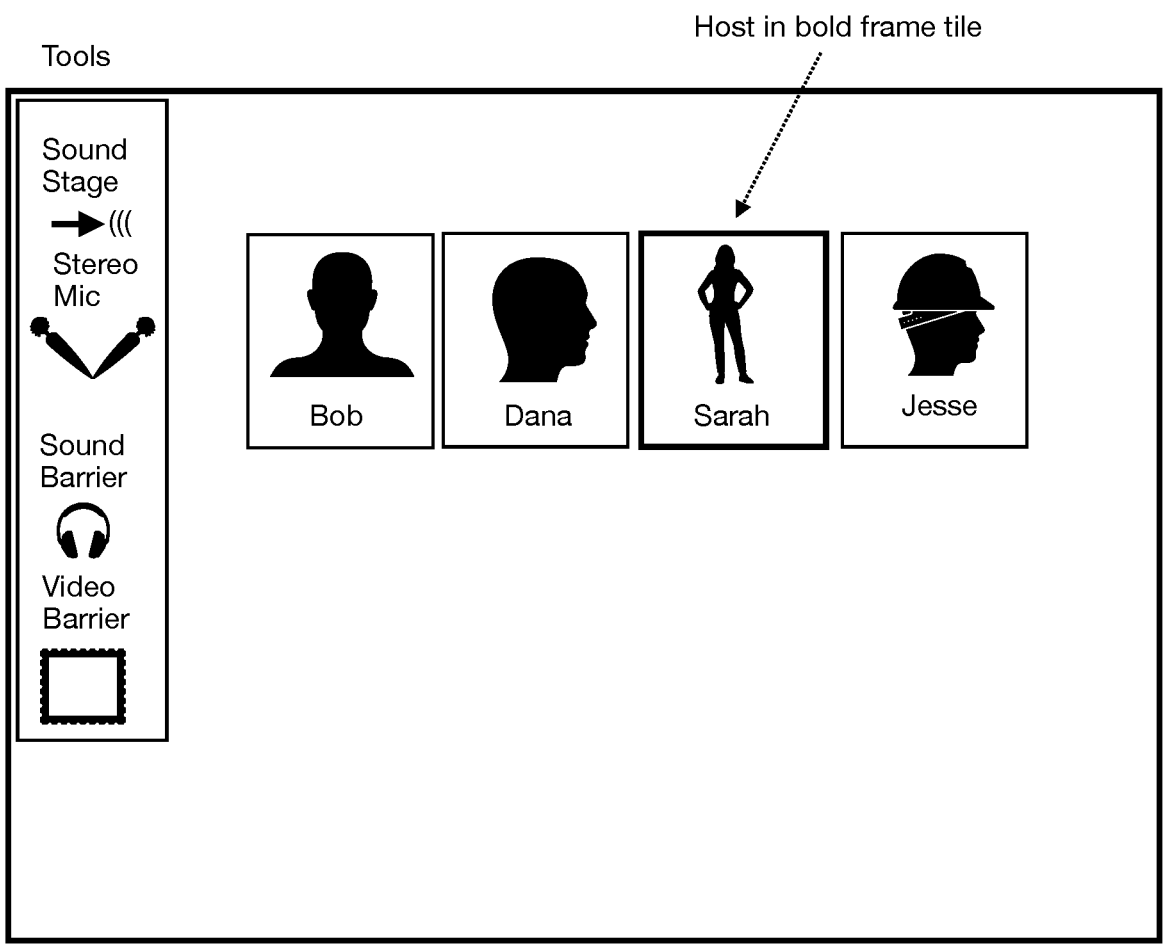
FIG. 1 shows an example of a Drag and Drop User Interface (UI) with Tiles and Drag and Drop Tools.

In FIG. 1, an example of a drag and drop user interface from the present invention shows tiles containing the video feed images, images which are the same size and shape as normally tile across video conferences user interfaces. Specifically for meeting patent filing drawing requirements, these video feed images have not been shown as images, but instead symbolically shown as a variety of silhouettes, each with their name underneath. The silhouettes show where actual video images appear in the actual present invention.

The host or moderator (host and moderator are used interchangeably) avatar tile has a bold thickness frame, so it is clear who is a moderator. There can be multiple hosts or moderators, which can be setup elsewhere (not shown) by users of the graphical user interface. In FIG. 1, the host is Sarah. There may also be a set of tools of the present invention, in a box to the left or some other side of the main window, containing pictorial objects which can be dragged into the main window by host(s). In some modes of the user interface, all participants can have access to these tools, in other modes only the host(s) have access. The sound stage object enables the creation of a sound stage which takes over the audio feed of the videoconference. The stereo microphone object enables a single location to be the focal location for hearing the event, which is then passed into the audio feed as the dominant listening location. The microphone can be used either in the sound stage (the default) or off the sound stage, as a roving microphone.

The sound barrier object enables the creation of break-out rooms where participants can gather to have private meetings, and then with minimal reorientation, reconvene in larger groups. All participants can still see the video from all other participants, but they hear only or mostly only the audio from their break out room.

These video barrier objects enable creation of isolated meeting rooms which can act as foyers or sorting areas for incoming participants who may be public ticket holders for events, or other participants whose credentials need to be validated. Video barrier object rooms may also be used as back-stage rooms for public video but private audio, so actors can present teasers before delivering their acts.

Dragging a tool from the tool box to the main shared window creates and places a new object, and dragging that object back to the tool box disposes of it. Resizing these objects by dragging on the corners enables users to reshape sound stages, breakout and isolated rooms into appropriate sizes, large enough to hold participant tiles but small enough to avoid wasting screen space.

Figure 2:
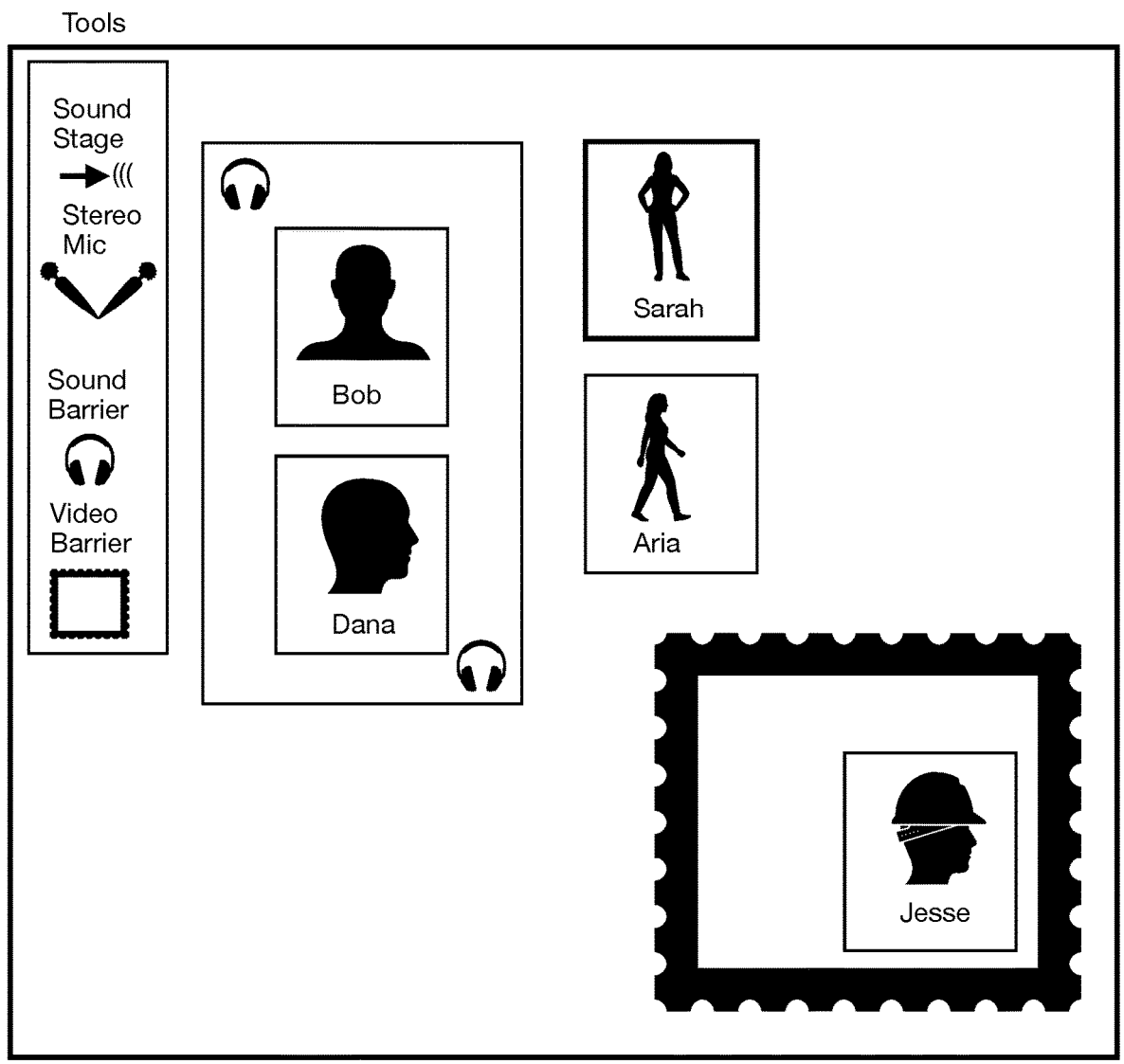
FIG. 2 shows an example of a Drag and Drop UI with Participant Attendee Avatar Tiles and Sound Barrier Objects and a Video Barrier Object.

FIG. 2 shows an example of a video conference in which Sarah is host, and Bob and Dana are in a break-out room with two corners indicating sound-reduction headphone icons. Each sound reduction icon means that the sounds going in and out of the box around Bob and Dana are cut in half (or some other GUI settable ratio). Double clicking, but not dragging on a corner of a break-out area toggles the icon on or off at that corner. The number of sound-reduction icons controls the degree of sound reduction. Two of four means a a 1:4 reduction in sound transmission. Three of four means a 1:8 reduction, and all four icons on means no sound is transmitted in and out of the box, for example in FIG. 2, to participants outside the box such as Aria and Sarah.

FIG. 2 also shows an example of participant Jesse in the video barrier. In higher security modes of the present invention, only the host(s) can see the video barrier rooms. In other modes, other participants can see a still image or user representation picture of the participant, so they can alert the host(s) to let them in. In most modes of the present invention only the host(s) can move incoming participants out of the video barrier. To hear and see the participants in the video barrier room, a participant drags their own tile into that room, an interaction which resembles physically walking into a foyer to greet people.

Figure 3:
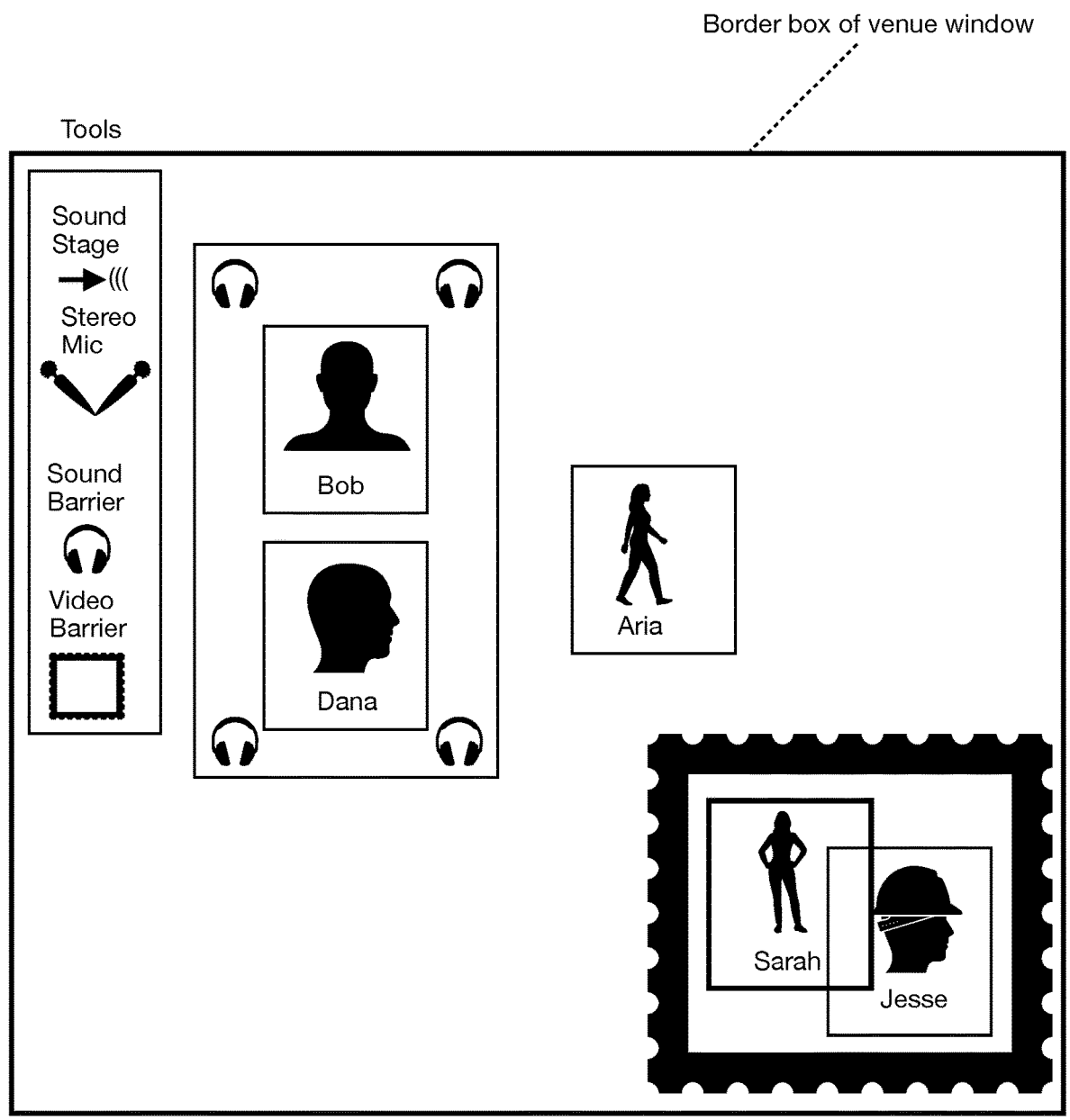
FIG. 3 shows an example of a Drag and Drop UI with Tiles and Moderator In Waiting Room Private Video Area.

In FIG. 3, host Sarah has dragged her own tile into the video barrier room with Jesse. Since her tile overlaps Jesse's tile, they have a private audio conversation in this barrier room, which remains private even if someone else enters the barrier room, such a subsequent newly incoming participant. Bob and Dana have clicked on their breakout room corners to increase their acoustic isolation so they also have full audio privacy, by having all four corners showing the sound-protection headphones. Aria is temporarily acoustically isolated from all others, although she can still see Bob and Dana's video feeds in their breakout room. To usher Jesse into the meeting with Aria, she drags Jesse's tile next to Aria. To usher Jesse into the breakout room with Bob and Dana, she drags Jesse's tile into that breakout box after enlarging the box by dragging on its corners to make it large enough for three tiles. If Sarah needs to refuse Jesse entry to the meeting, Sarah can drag Jesse's tile beyond the border box of the venue enclosing all other boxes in FIG. 3. This results in a message send to the ejected participant that 'The host has removed you from the meeting."

Figure 4:
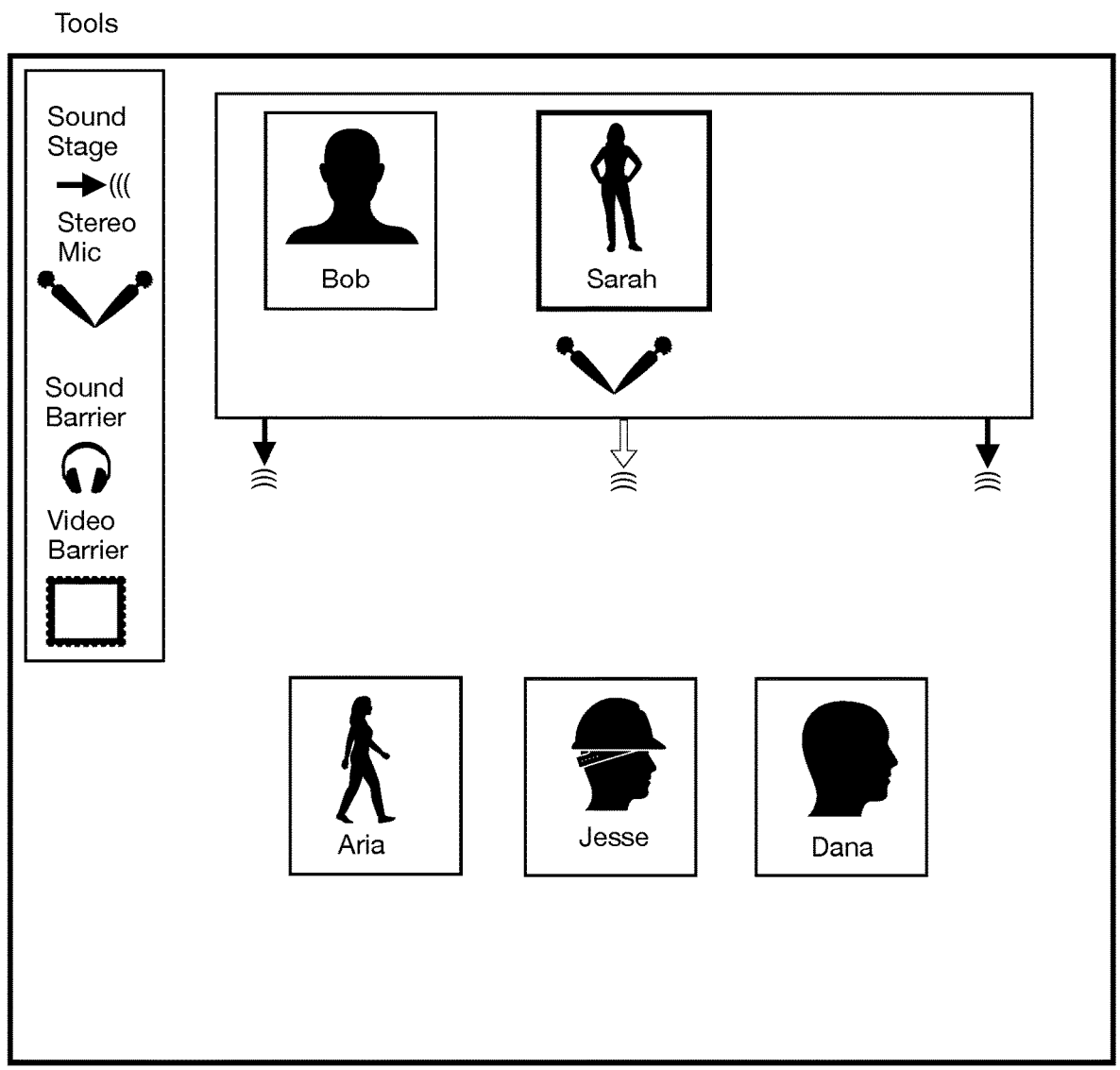
FIG. 4 shows an example of a Drag and Drop UI with Tiles and Flow Lines for Stage Microphone.

In FIG. 4, the host Sarah has dragged the Sound Stage object and Microphone Object to create a stage venue for the meeting space. In this venue, there are two dark arrows with sound waves showing the direction of sound picked up by the Stereo Microphone, towards the offstage participants Aria, Jesse and Dana. There is also a dormant third arrow, shown as an outlined arrow. Using a default setting of sound-reduction, each dark arrow creates a 2:1 increase in sound from the stage and and 2:1 decrease in sound from offstage participants. Clicking on the third arrow to make is dark would keep all the sound offstage from reaching the microphone, and only the sound from onstage participants would reach the video conference feed.

Figure 16:
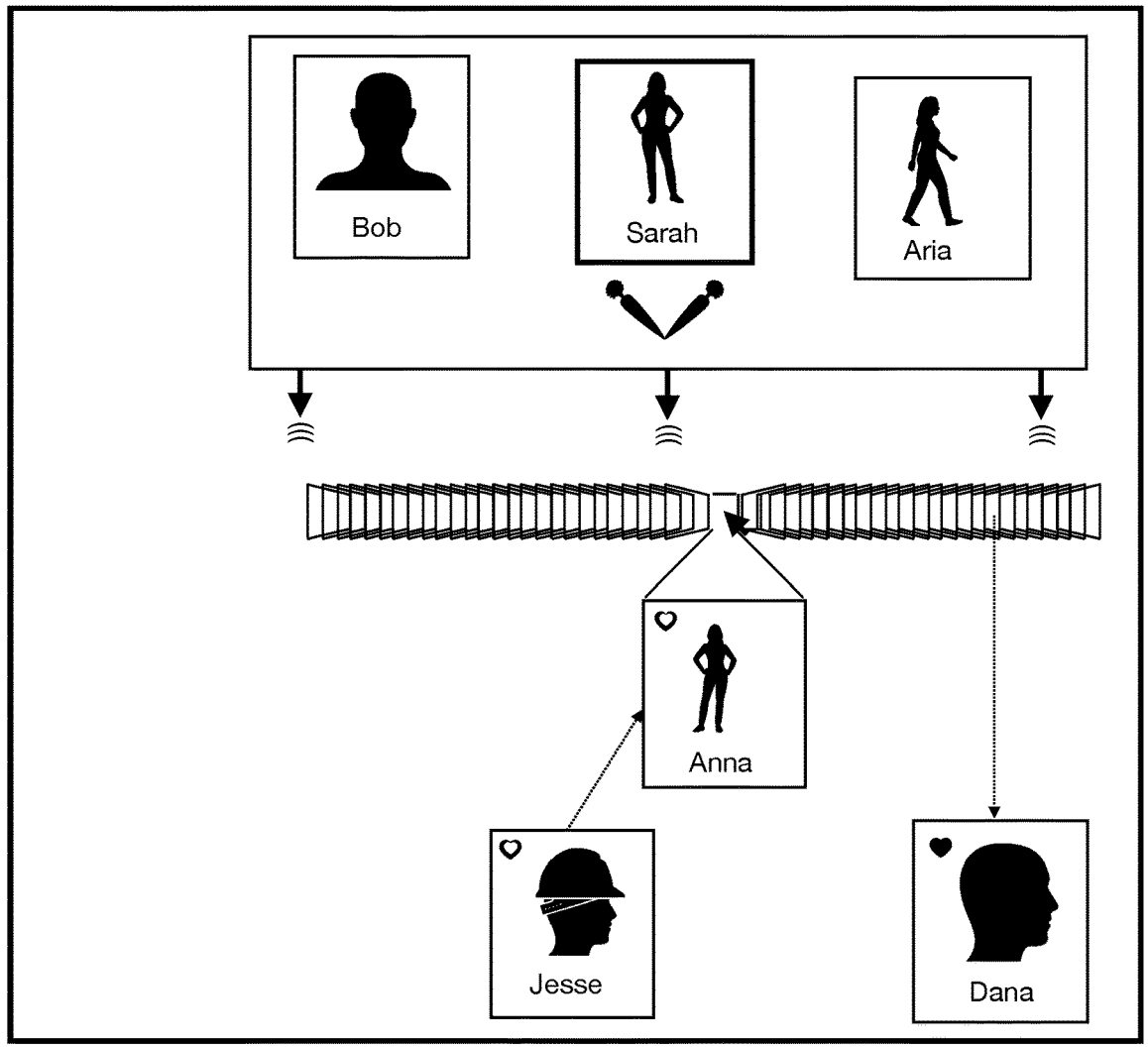
FIG. 16 shows an example Of Displaying Overlapping Tiles In Crowded Overviews.

In FIG. 4, onstage, the position of the microphone is in front of Sarah the host, and Bob is to the left of the microphone. Using synthesized binaural acoustics, the binaural feed from the videoconference presents a stereo image with Bob talking from the left whereas Sarah sounds as if talking directly in front. There is only faint sound audible from Aria, Jess and Dana who are offstage, and if they were to yell loudly they can be heard in their respective positions: Aria behind and to the left, Jesse behind and centered, Dana behind and to the right. In events with really large numbers of participants, the tiles for offstage participants can be shrunken to fit onscreen, although each participant will see their own tile at a larger size to make it easier to see and drag themselves around the venue (FIG. 16).

Figure 5:
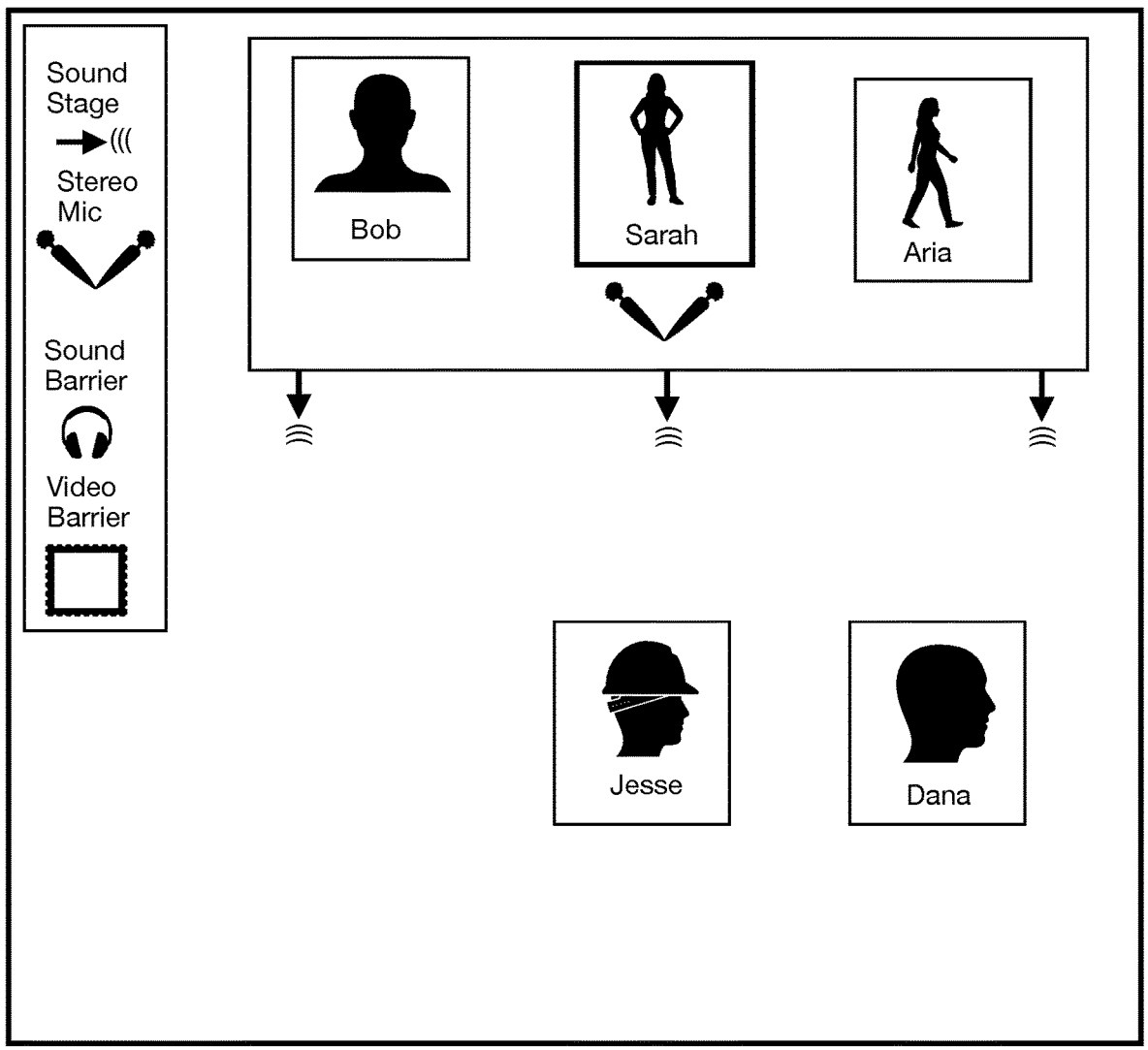
FIG. 5 shown an example of a Drag and Drop UI with Performing Attendees On a Stage Area and Audience Attendees Offstage.

In FIG. 5, the host Sarah has clicked on the third of three sound stage arrows making it black, so only sound from the stage is heard in the videoconference. This is very useful in large videoconferences where hundreds of participants create a high risk that at least a few have accidentally not muted their sound, allowing unwanted background noise such as dogs barking and babies crying into the event. When someone wants to be heard, they can drag their own tile on to the stage, as Aria has done, so whatever they say can clearly be heard, and all can see who is speaking: since Aria is to the right of the microphone, her voice will be heard as coming from the right in the binaural audio feed. This is what all participants will hear, so they all can understand from the binaural feed corresponding to the visuals that Aria is talking.

Figure 13:
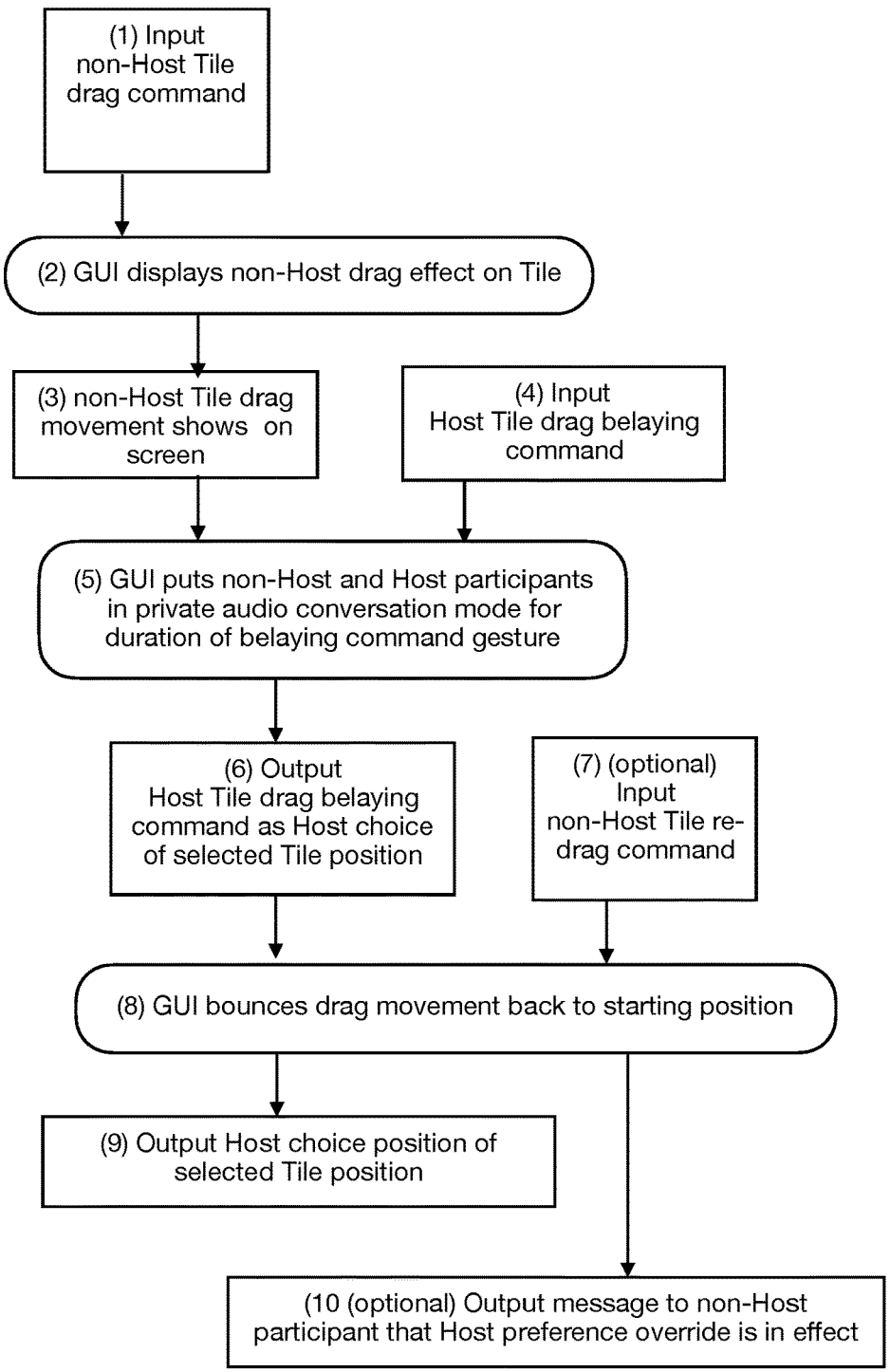
FIG. 13 shows a Method Of Enforcing Host Moderator Tile Placement Preferences.

There may be cases, especially in large conferences or live performance events, where people rush the stage and interrupt the desired flow of presentations. FIG. 13 shows a method for enabling the hosts such as Sarah to override a participant who has dragged their tile onstage, or to any other undesired location in the venue. Sarah could chose to override by dragging the participant to where she wants them, which could be back in the main audience, or even a video isolation room, where she can have a private conversation with them to smooth things out. During the drag gesture to get there, by default, Sarah can have a private conversation with the dragged participant to explain why she is moving them. These features make it easier to perform the ushering and bouncer roles in large events with lots of people who are may not always be completely comfortable or compatible with the themes of the event. Should the participant try to override the host's selection of position, that participant's tile icon will just bounce back to position chosen by the host, with an optional explanation that their choice has been overridden by the host.

Figure 6:
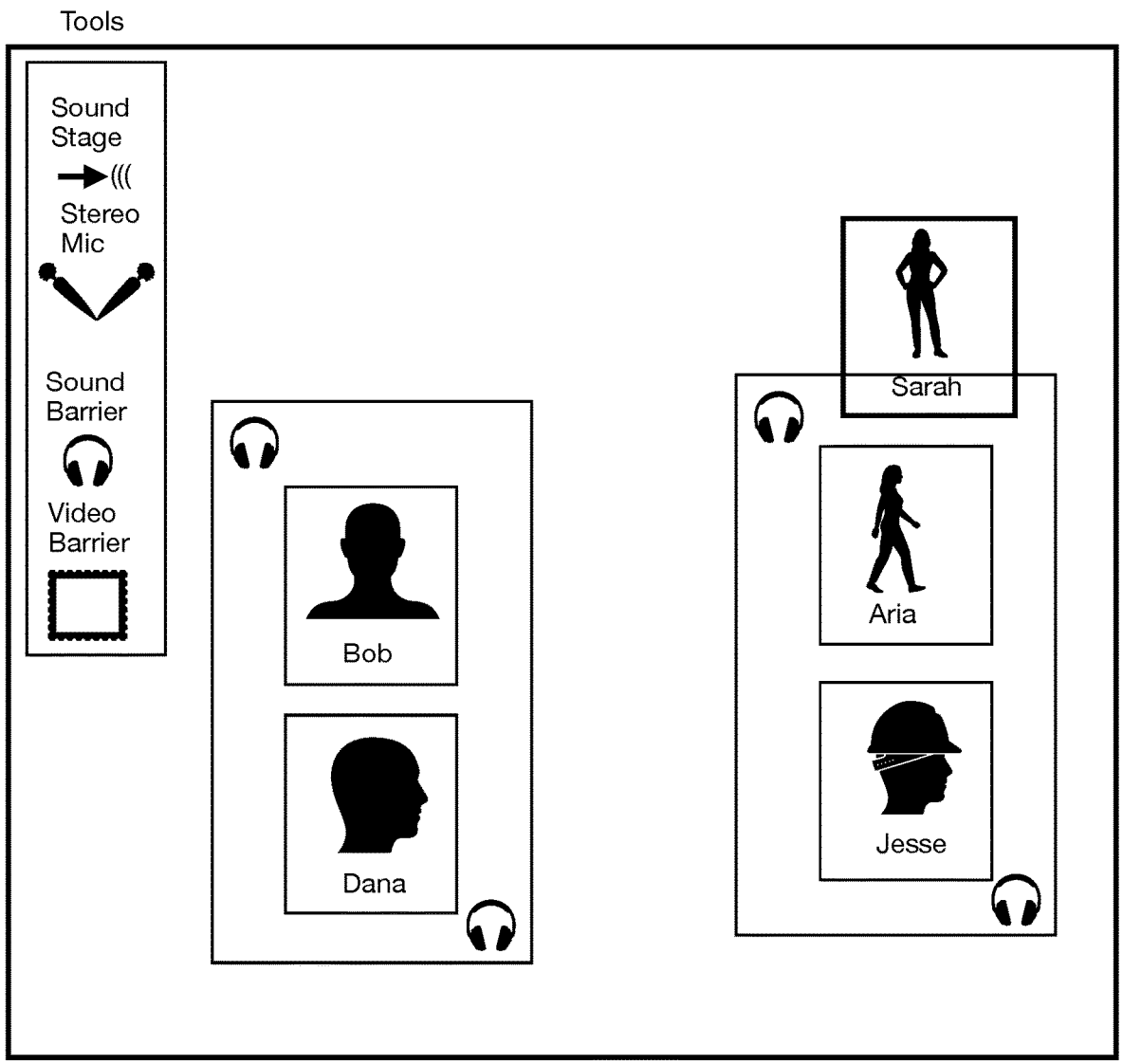
FIG. 6 shows an example of a Drag and Drop User Interface with Multiple Breakout Rooms.

FIG. 6 shows a videoconference with two break-out rooms, which for example could be useful for classrooms. Bob and Dana are in one breakout room, and Aria and Jesse are in the other room. Since there are two sound protection headphone icons on both rooms, only the loudest sounds from Bob and Dana will reach Aria and Jesse. Sarah, because she has dragged her own tile into the breakout room to check in on Aria and Jesse, can hear everything they say at full volume. If she drags her tile out of that breakout room, she can hear faintly what everyone is saying, what she hears will be biased to favor the breakout room she is nearest. This allows person-to-person interactions between teachers can walk around to monitor progress of breakout groups and interact with students as needed. In variations of the present invention, a host walking around will cause the tiles nearest to them to enlarge in size, to emphasize what they are checking in on (not shown).

Figure 7:
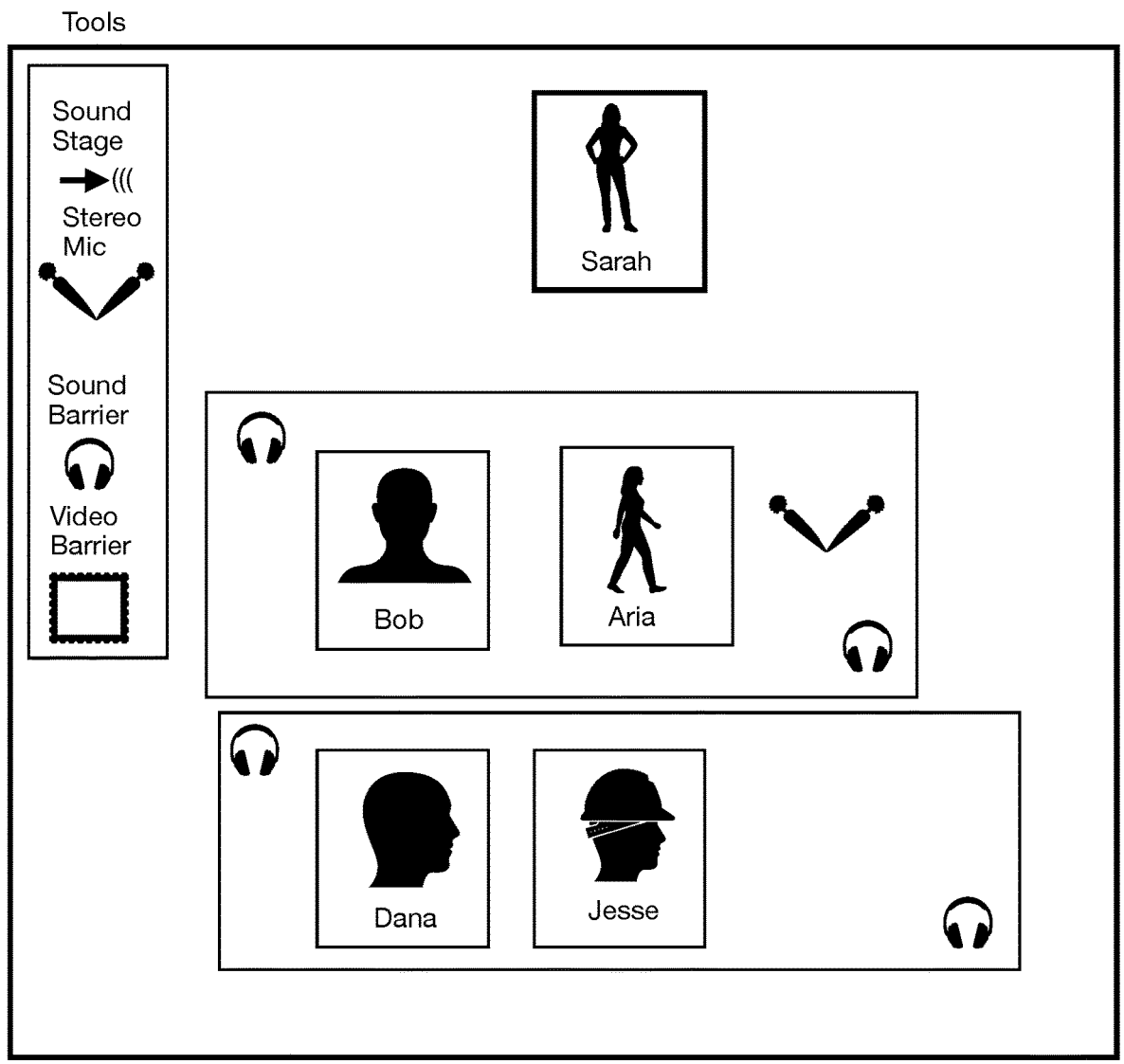
FIG. 7 shows an example of Rearranged Breakout Rooms and a Roving Microphone.

FIG. 7 shows the videoconference classroom of FIG. 6 but with the breakout rooms rearranged to allow more space for participants to drag their tiles into them to join other participants already inside them. In addition, the host Sarah has dragged the microphone of the tool box next to Aria, so Aria can speak directly to all participants in the videoconference, as can Bob, but at a lower volume since he is farther from the microphone. This is useful for teachers if they overhead something valuable being said in a breakout room, and want to quickly have students repeat to the whole class before the excitement of the moment of discovery has passed.

Figure 8:
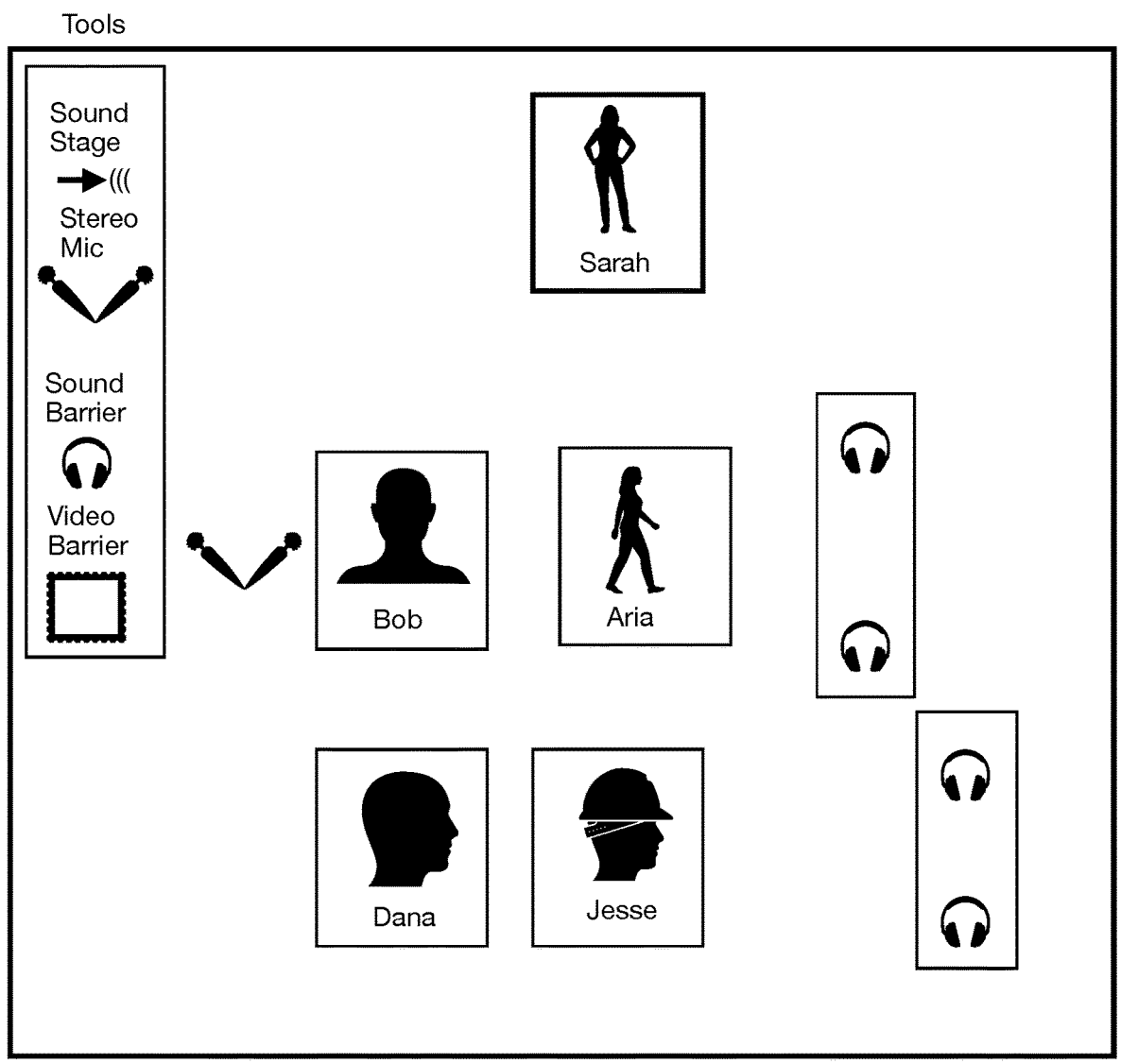
FIG. 8 shows an example of Dragging Breakout Room Boundaries To Release Participants.

FIG. 8 shows the videoconference classroom of FIG. 7, but with the left corners of the breakout rooms dragged to the right, so they no longer enclose any participants. Just as lightweight accordion style dividing walls in physical conference rooms and ballrooms can be slid to one side to open spaces back up, the breakout rooms of the present invention can be quickly slid to the side to reunite participants in a single open acoustic space.

Also in FIG. 8, the host has dragged the stereo microphone to emphasize whatever Bob has to say in the videoconference audio output feed, by increasing the proportion of Bob's audio by the closeness of the microphone to Bob's tile. If the microphone were dragged onto his tile, his audio would completely dominate the output feed.

Figure 9:
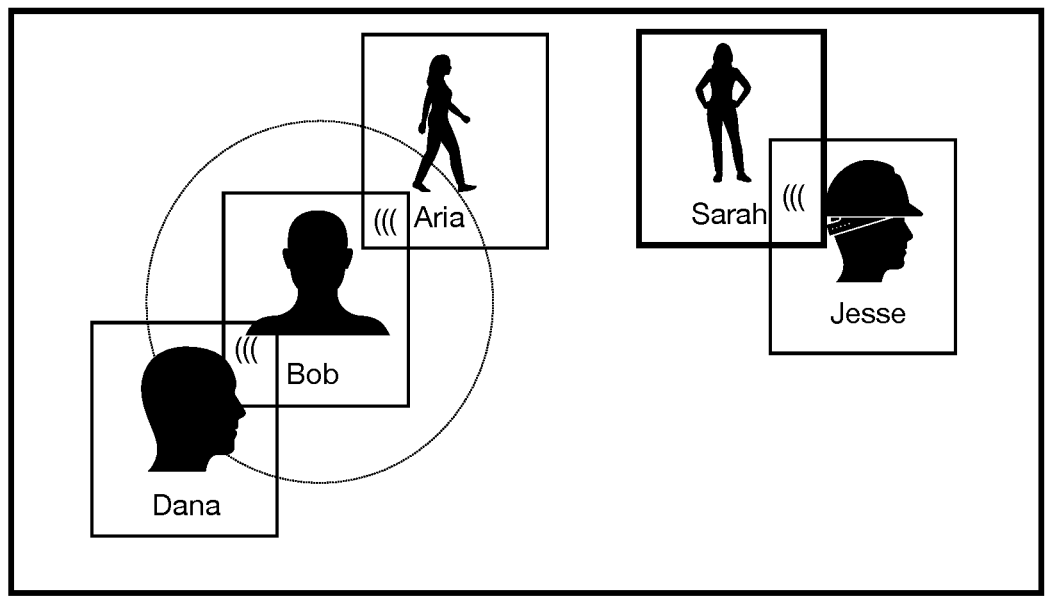
FIG. 9 shows examples Of Dragging Onto a Participant To Privately Talk To Them.
Figure 9:
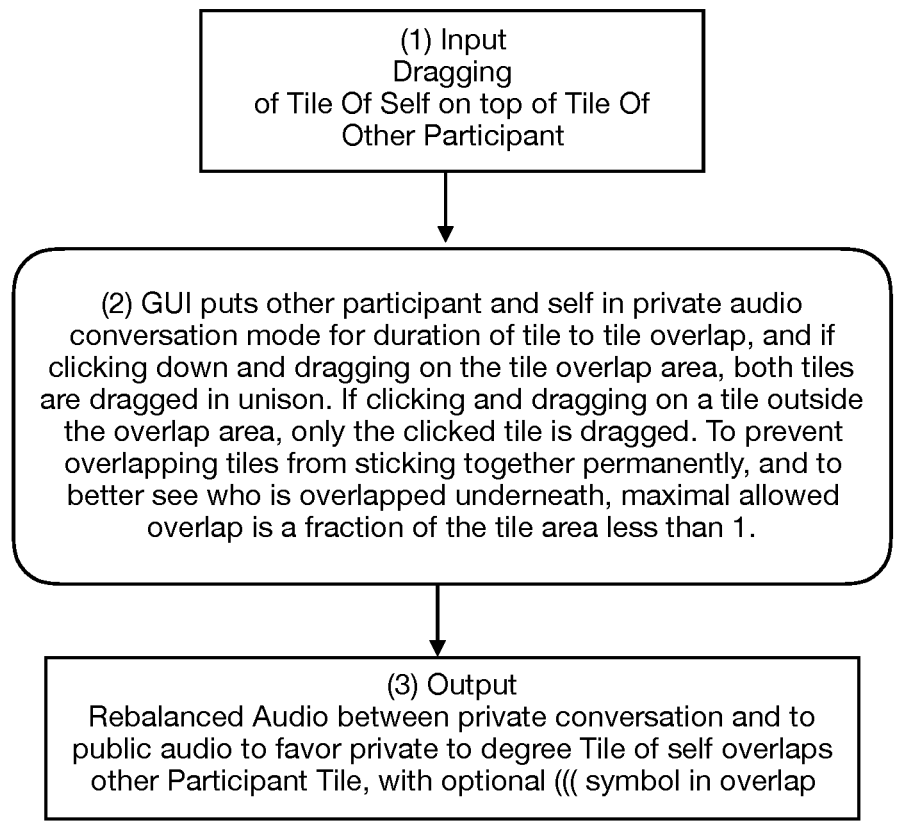

FIG. 9 shows examples of participants dragged into each other to create private zones of conversations between them. Unlike the breakout rooms, none off the audio from these private zones is audible to other participants. These private zones function similarly to having all four soundproof icons in the breakout rooms activated. However there is a difference: this privacy is not commutative so in the FIG. 9 example Bob can hear both Aria and Dana but Aria cannot hear Dana and Dana cannot hear Aria. In physical acoustics this is like Aria whispering in Bob's ear while Dana whispers into Bob's other ear. The (((icon appears in the overlap areas to show that private zone audio is in effect. Without thus overlapping the tiles, private zone audio is not created; having tile very close to each other but not touching makes the audio transmitted between the corresponding participants more intense, but not private. The method flowcharts of this patent use square corner boxes to represent data, and round corner boxes to represent processing steps. For instance "Input Dragging of Tile Of Self onto Tile Of Other Participant" is data, whereas "GUI puts other participant and self in private audio conversation mode for duration of dragging command gesture, showing tile of self behind other participant tile" is the processing step shown in FIG. 9. Dragging one's tile more than halfway onto another participant makes the audio feeds between these two participants entirely private to each other.

In person-to-person interactions, people need a comfort zones around themselves, particularly with strangers. In FIG. 9 the comfort zone around Bob is shown with a dotted circle, which surrounds Bob's tile. Bob can, if he wishes, to override the movement other participant may make to drag their tiles, or his tile, to approach within this comfort circle. The method for enabling these comfort zone overrides illustrated by FIG. 14, details of which are which is discussed later.

Figure 10:
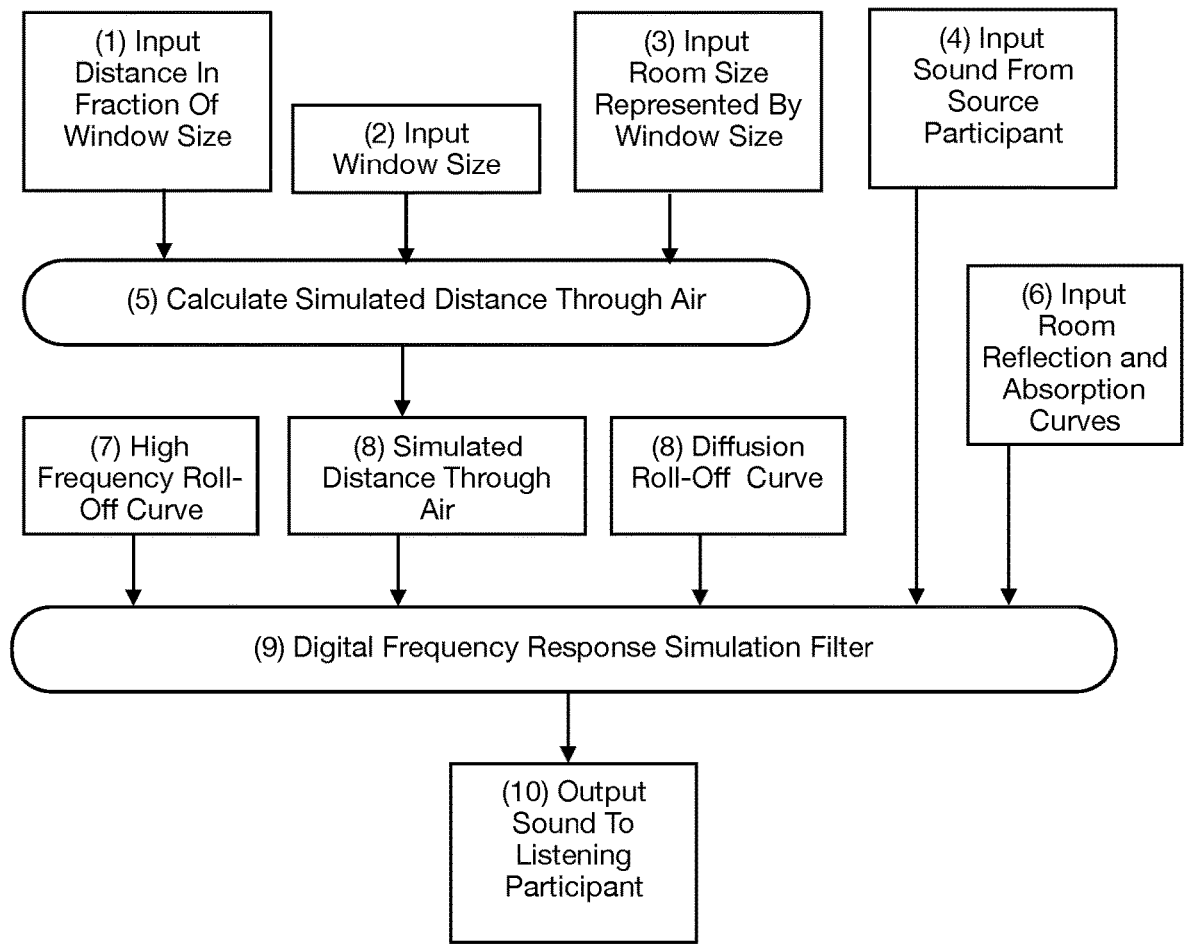
FIG. 10 shows a Method Of Simulating Acoustic Distance Between Participants.

FIG. 10 shows a method for simulating acoustic distances between participants. Physical sounds traveling through air are affected by that air in several different ways. The farther the sound travels the more it spreads out and this reduces its intensity and apparent loudness. Sound energy is also absorbed by air but that effect is greater for high frequencies than low frequencies, so the farther a sound travels, the more the intensity of high frequencies is reduced relative to low frequencies. There are also reflections and absorptions of sound created by room boundaries around the sound. Different venues will create different amounts of reflections, from plaster or wood surfaces, and absorptions, from carpets, drapes and other participants. These can all be modeled and calculated using acoustic models.

The method of FIG. 10 shows steps in how these effects are simulated in a videoconference, using the visual distances between participant avatar tiles displayed in examples shown in FIG. 1 to FIG. 9 as a driver for "Input Distance In Fraction Of Window Size", "Input Window Size" and even "Input Room Size Represented by Window Size" which is the size implied by the border box of venue window in FIG. 3, extrapolated from settings chosen by the Host in the GUI (not shown). Since the video barrier area containing Sarah and Jesse is much smaller than the larger border box of venue, the room tone Sarah and Jesse would hear in terms reflections would sound a lot more like a small closet, with short latency reflections with little high frequency roll-off. If Sarah and Jesse were to continue talking after Sarah dragged Jesse in the main border box of venue, they would hear much longer latency and less high frequency reflections from the more distant walls of the larger border box of the main venue.

Since the sound delivered to the participant is dependent upon distance, and closeness to wall boundaries, differences in distance and proximity to walls make the sound delivered between participants by "Digital Frequency Response Simulation Filter" of FIG. 10 distinctly difference for each pair of participants in FIG. 1 through FIG. 9. Unlike prior art, calculating these differences occurs for each pair of participants, unless the Sound Stage tool as shown in FIG. 4 and FIG. 5 is used to simplify the audio output feed around a Stereo Microphone. For really large numbers of participants, the computation costs of customizing sound transmitted between each pair of participants is exponentially greater, so the Sound Stage tool is a great way to reduce that computational cost. The same is true for simulating binaural hearing: the Sound Stage tool greatly reduces the cost of binaural hearing simulation as well.

In FIG. 11, a method to simulate binaural hearing for the present invention is outlined in steps. The terminology used in FIG. 11 deserves some introduction, as it is based on prior art work in computational acoustic simulations. A good example of this work exists in the "3D Tune-In Toolkit" which is an open-source software library for simulating binaural hearing from monophonic sound feeds and an acoustic model of human anatomy. There is a paper describing this open-source library published in Mar. 11, 2019 on the world wide web by https://doi.org/10.1371/journal.pone.0211899 and written by authors María Cuevas-Rodríguez, Lorenzo Picinali, Daniel González-Toledo, Carlos Garre, Ernesto de la Rubia-Cuestas, Luis Molina-Tanco, and Arcadio Reyes-Lecuona.

I quote from the above paper:
Both interaural and monaural cues are embedded in what is known as a Head-Related Transfer Function (HRTF—if expressed in the frequency domain) or Head-Related Impulse Response (HRIR—if expressed in the time domain), which characterizes how the ears receive a sound from a given point in space, generally specified in terms of azimuth (angle on the horizontal plane, positive going anti-clockwise), elevation (angle on the vertical/median plane, positive going upwards) and distance. A set of HRTF measurements or estimations at various locations around the listener's head (possibly uniformly spaced at given distances), represents a full characterisation of the cues used by a specific human listener for localising a sound source in the surrounding environment. For simplicity, in this paper we use the term HRTF for the full transfer function and, by extension, the full set of measurements. We then use the term HRIR to refer to each of the individual measurements or estimations of this function at various locations, which together characterise the HRTF.

Using their terminology, I've put data "Input HRTF of listening Participant" and "(optional) Input HRIR of listening Participant" along with data "Input 3D locations of Participants" and "Input Sound From source Participant" as initial method steps. Since the GUI of the present invention implies that the simulated venue is a level flat floored room, with equal height participants, there is little elevation data in 3D locations of Participants except for participants on the Sound Stage of FIG. 4 and FIG. 5 which could be by default a simulated 3 feet higher than the participants on the offstage level. In contrast there is an abundance of 2D positional information on the participants, since each of their tiles is shown in a distinct position, enabling a GUI to estimate relative azimuth and distances between participants. In addition, it is optionally also possible to estimate the rotation of the head from video images of participants, so as participants rotate their heads, the azimuth angle implied by that rotation smoothly shifts, enabling the "Digital Signal Processor of Mono to Binaural Simulator" of FIG. 11 to simulate for each participant how sounds appear to rotate around them when they rotate their physical heads.

The ability to localize sounds is very useful to teachers and hosts of events where picking out individual conversations is important to monitoring the event. Therefore, high fidelity binaural simulation from source participant audio is crucial for supporting teachers and hosts, particularly when participants are paying for the events and expecting good value for their money.

Fortunately, decreases in computer processing costs have recently made high fidelity binaural simulation much less expensive and more practical in real-time videoconferencing audio feeds. A paper published by The Journal of the Acoustical Society of America 125, 2690 (2009); https://doi.org/10.1121/1.4784283 and written by Griffin D. Romigh and Douglas S. Brungart has made it clear that high fidelity of binaural simulation is possible. I quote from Romigh and Brungart:

> Several researchers have shown that individualized head related transfer functions (HRTFs) can be used to produce virtual sounds that are equivalent in terms of localization to free field sounds. Thus far, however, these results have only been shown in studies that have required listeners to keep their heads stationary during the playback of the virtual sounds. In this study, we investigated the performance limits of a virtual auditory display system that incorporated individualized HRTFs but allowed free head motion during the localization process. One key aspect of the system is a high-speed HRTF measurement process that allowed a full set of individualized HRTFs to be measured in less than 4 min. This made it possible to make an HRTF recording and complete a localization task using the resulting HRTFs within the same 30-min experimental session. The results show that equivalent free-field and virtual localization performance was achieved when the virtual sounds were generated in the same session using specially-designed open-ear headphones that did not need to be removed during the headphone equalization process. This indicates that equivalent real-virtual closed-loop localization is possible even with the truncated, interpolated, minimum-phase HRTF filters that are required for practical, real-world virtual audio systems.

The present invention takes advantage of this and other similar work to measure HRFTs of individual participants, or to at least use prerecorded generic versions of HRFTs offered as menu choices to choose from various participant head types to more accurately simulate binaural localization in classrooms and other important simulated venues. Teachers in particular will want to take the four minutes to record customs HRFTs for themselves so they can more clearly distinguish what is being said when multiple students talk at the same time.

(The methods and GUI for recording custom HRFTs is not shown.) FIG. 11 shows an example of participants tiles for Dana and Jesse in distance and azimuth relationships to the participant avatar tile for Bob. The GUI displays a distance A and a distance B between Dana and Bob's left ear, and between Dana and Bob's right ear respectively. The two distances are distinct, so the "Digital Signal Processor of Mono to Binaural Simulator" will delay Dana's sound from reaching Bob's right ear slightly, because sound propagates at about 1100 feet per second in air. That delay in sound is enough to acoustically make Dana appear to be speaking from Bob's left side. For greater accuracy, there are comb filter effects of Bob's face as the sound from Dana diffracts around from left side of Bob's head to his right ear, which are modeled by using "Input HRTF of listening Participant" for Bob to more closely model binaural locational effects.

Since Jesse's location is both behind and to the left of Bob, Jesse's path difference between Bob's left and right ears is less distinct, and more of Bob's ability to localize Jesse will depend on the accuracy of the HRTF chosen for Bob. With head motion detection this can be made even more like a physical venue, so when Bob rotates his head, to face Jesse while Jesse is speaking, he can more clearly hear Jesse in front of him and confirm that Jesse is the speaker.

Figure 12:
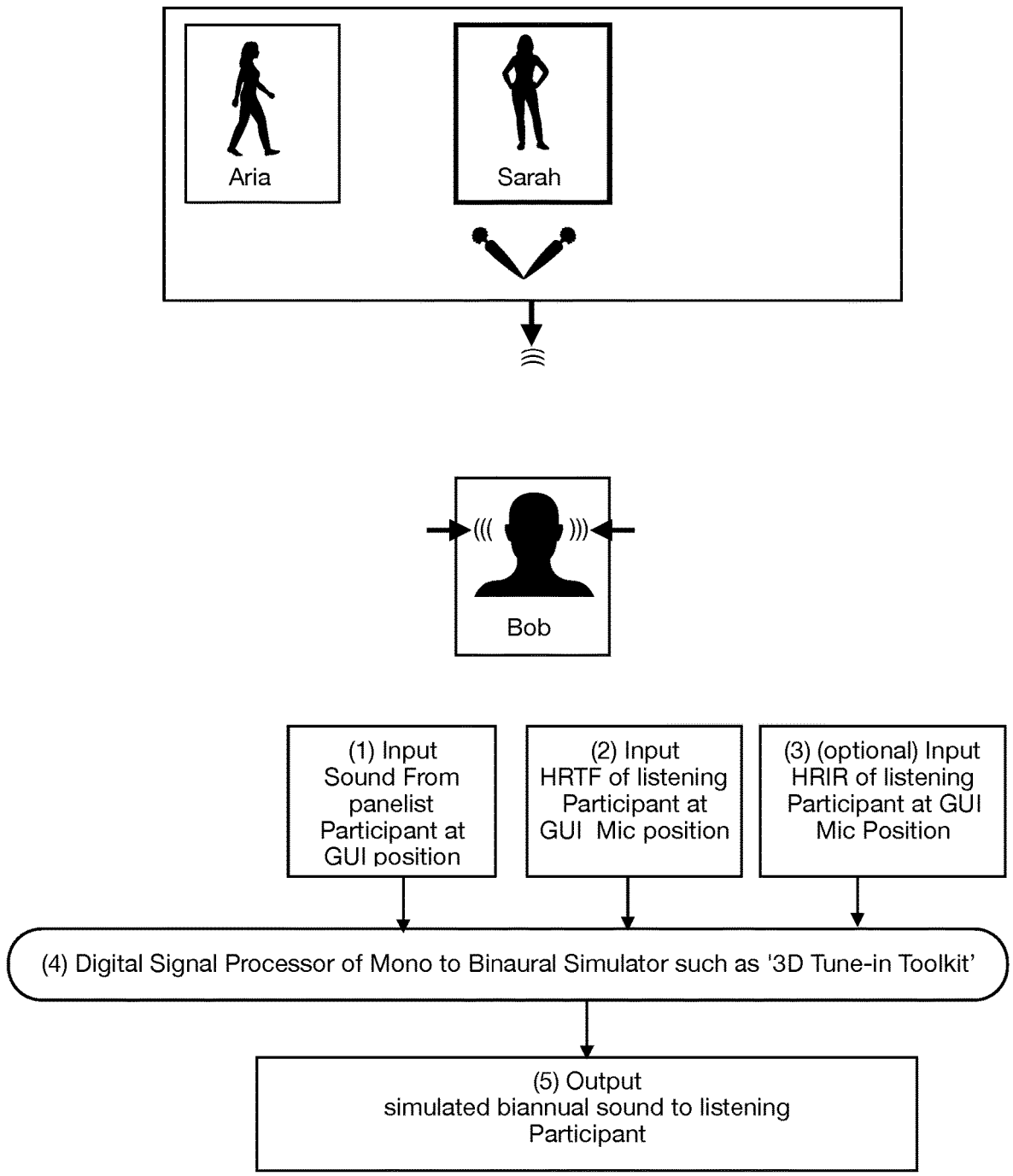
FIG. 12 shows a Method Of Simulating Binaural Sound Transmission From Stage Microphone To Audience.

FIG. 12 shows how the method of FIG. 11 can make the simulated sound picked up by the Stereo Microphone of the present invention more useful to listening participants. The Microphone becomes a stand-in for the position of a head of a generic listening participant, simulated at the position shown by the microphone in the GUI, as shown in FIG. 4 and FIG. 5 and FIG. 12. Just as a participant at the microphone position would hear sounds binaurally simulated at that location and azimuth, the "Digital Signal Processor of Mono to Binaural Simulator" of FIG. 12 delivers a binaural feed enabling the listeners such as Bob to binaurally better distinguish which of Aria or Sarah is saying what, if they were to speak at the same time.

As in FIG. 11, addition optional accuracy can be achieved in FIG. 12 if the individual listeners each use their custom individual "Input HRIR of listening Participant" so the "Digital Signal Processor of Mono to Binaural Simulator" can model the actual comb filter effects of their individual physical heads and real time head azimuth rotations.

Since placement of participant provides such a controlling affect on the acoustic experience of each participant, the ability to control avatar video tile placement on the shared GUI window is important. Since each participant can drag their tile around this gives them the freedom they need to move around and interact with different people. And, since relative tile placements thus become significant, the present invention provides ways to settle differences in opinion about preferred avatar tile placements.

Figure 14:
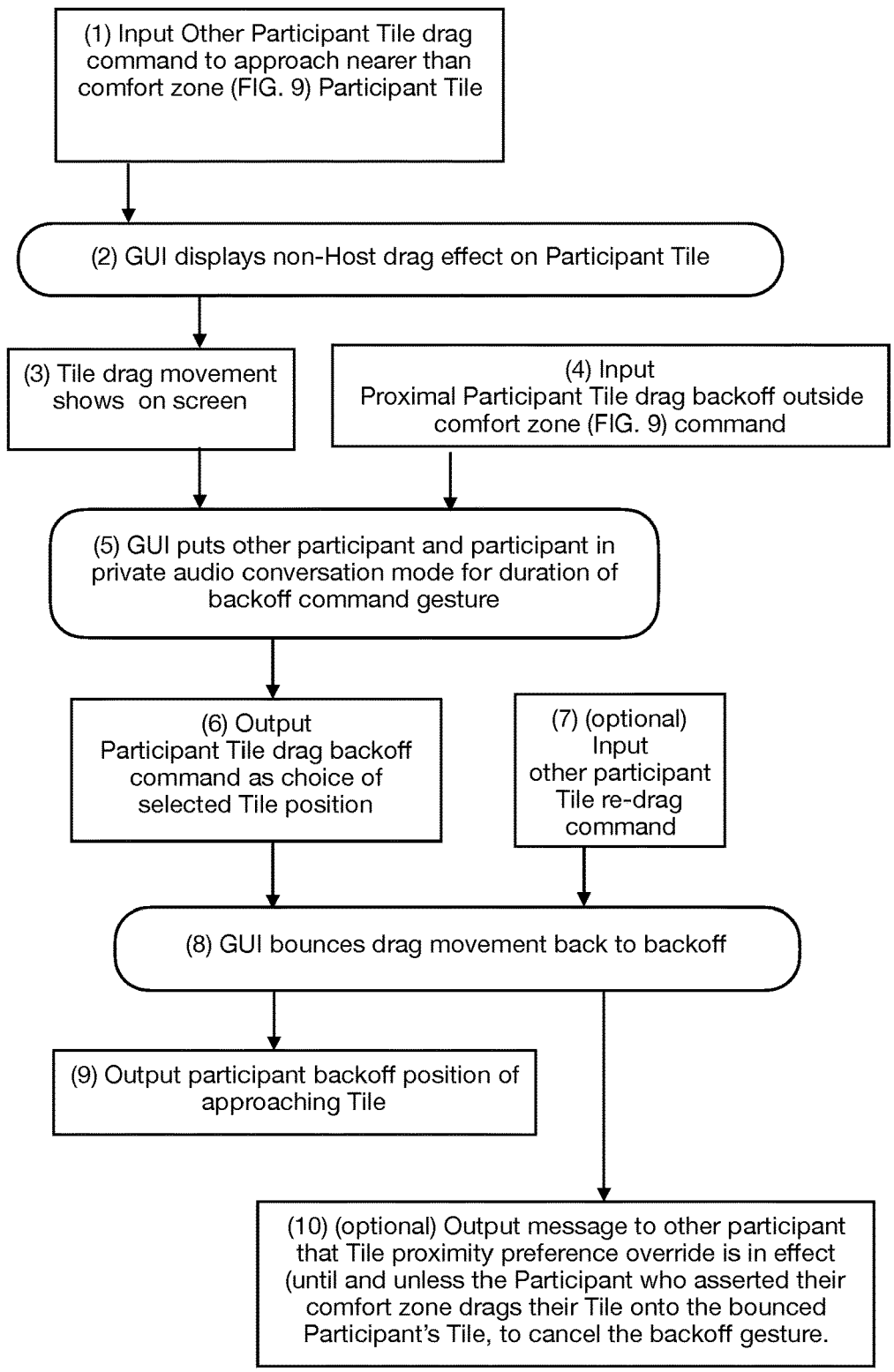
FIG. 14 shows a Method Of Enforcing Participant Tile Placement Preferences.

In FIG. 14, as with FIG. 13, the present invention provides ways to override a tile placement. In FIG. 13, a host can override any tile dragging command. In FIG. 14, a participant can override others (who are not hosts) who attempt to drag their own personal tile around or drag another tile inside their personal comfort zone (as shown in FIG. 9 for Bob). This simulates the comfort zone they'd normally need in a physical space, to escape someone who dragged them to another location against their will, or who approached them too closely. As in FIG. 13, this means to override includes moving their own tile back and if the other participant is persistent approaching too closely, automatically bouncing the approaching tile back and outputting a message to the other participant that they've been overridden. This method of the present invention enables every participant to act as their own bouncer, greatly reducing the comfort and reducing the cost of security compared to those costs in prior art venues.

Figure 15:
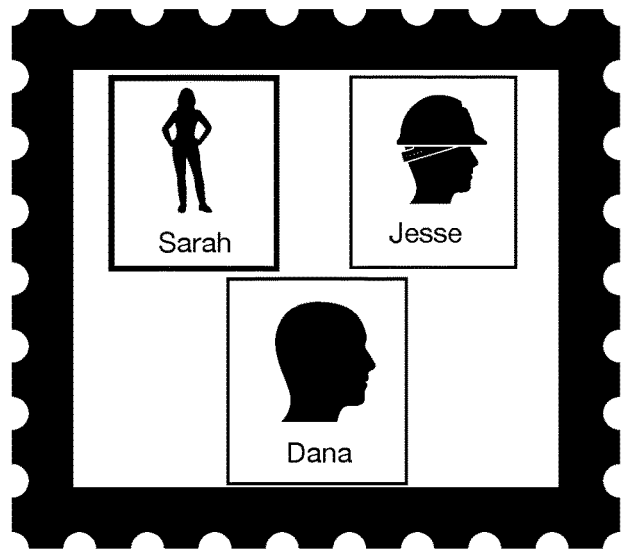
FIG. 15 shows a Method Of Displaying Waiting Room Tiles to a Host Moderator Or Panelist.
Figure 15:
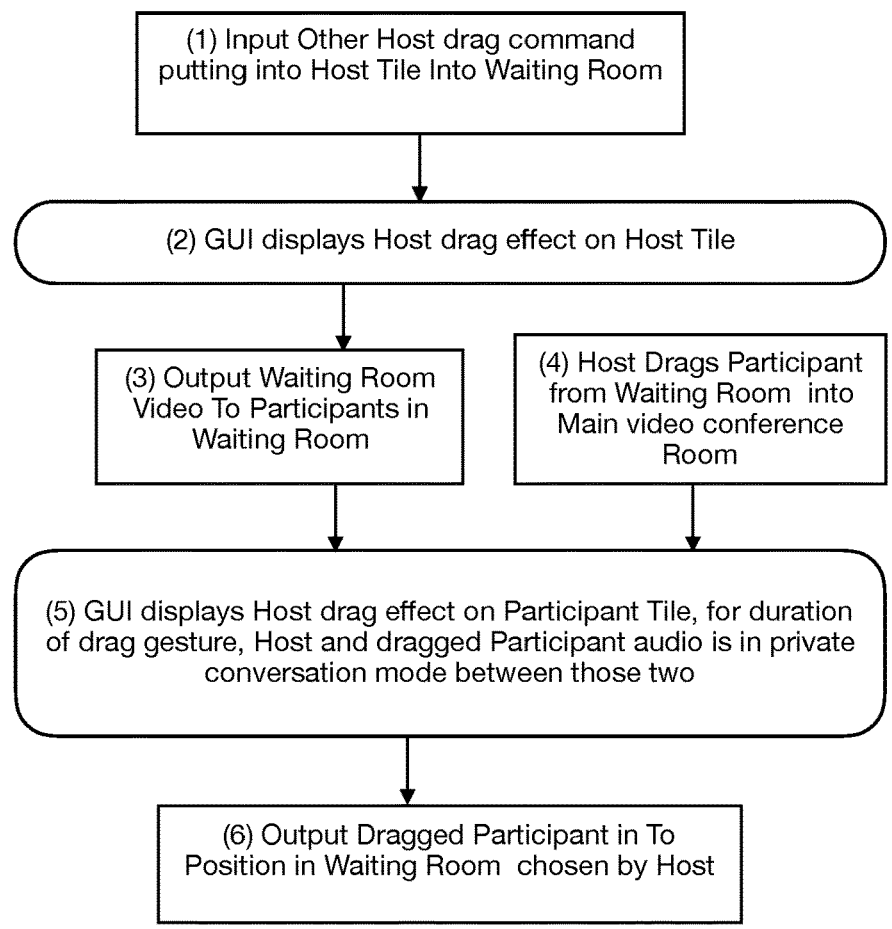

The present invention also supports other valuable social interaction protocols, regarding the welcoming of participants into events. FIG. 15 shows how a single host can address multiple incoming participants in a video barrier room foyer. In this example, Sarah can talk privately to Jesse and Dana about the event, before ushering either one into the main event space. During this time Jesse and Dana can only see video of the barrier room foyer tiles. They can drag themselves around in this space but cannot see or drag themselves into the main event space. The host Sarah has to admit them to the main space by dragging them to it, and during that drag event, Sarah and the participant(s) being dragged are by default in a private conversation with each other, similar to the way a physical usher is generally in a hushed and nearly private conversation with participants being ushered into a large venue. While a host such as Sarah is in the barrier room foyer, her tile may be viewed by other participants already in the main room, as a half-dimmed tile to show that she's still somewhere in the event, with an optional explanation that she's in the waiting room foyer or other name for the welcoming barrier room of the event (not shown).

Since the examples shown of videoconferencing breakout areas, video barrier rooms and sound stages can be reused over and over, just as teachers reuse a classroom layout over and over, the present invention provide means to name and save venue configurations so the work of configuring can be saved and provide a convenient home base reference point for participants, who can anticipate reconvening in familiar locations in familiar break-out areas or sound stages where they've done work before with other familiar participants. The network effect of this familiarity with pre-configured venues is to create an valuable reusable architecture for community activities conducted in virtual spaces. important but easily implemented GUI controls and methods to save venue configurations for future classes and events are not shown.

FIG. 16 shows a version of the stage in FIG. 5, but with an example of a space-efficient "linear icon" for concentrating crowded icons of a venue overview. When avatar icons reach too high a density in a vene overview, to conserve space, the icons which are crowded together can be automatically collapsed in to a linear icon having just thin overlapping outline, arranged like a spread stack of playing cards, to reduce the space taking by 10 or even 100 to 1. In doing so, the person-to-person interactions made possible by the present invention support the kinds of interactions one might have at a medium to large scale concert event, with 100 to 5000 ticket holders.

In FIG. 16, the avatar icon for Anna is shown in expanded size, as "popped-out" of the linear icon of trapezoidal outlines to the left and right of the GUI cursor arrow above the icon for Anna. This is how the GUI may look when any participant clicks on the linear icon at the trapezoidal outline for Anna. It is also how the GUI might look to Anna after Anna drags her personal icon into the linear icon.

Figure 19:
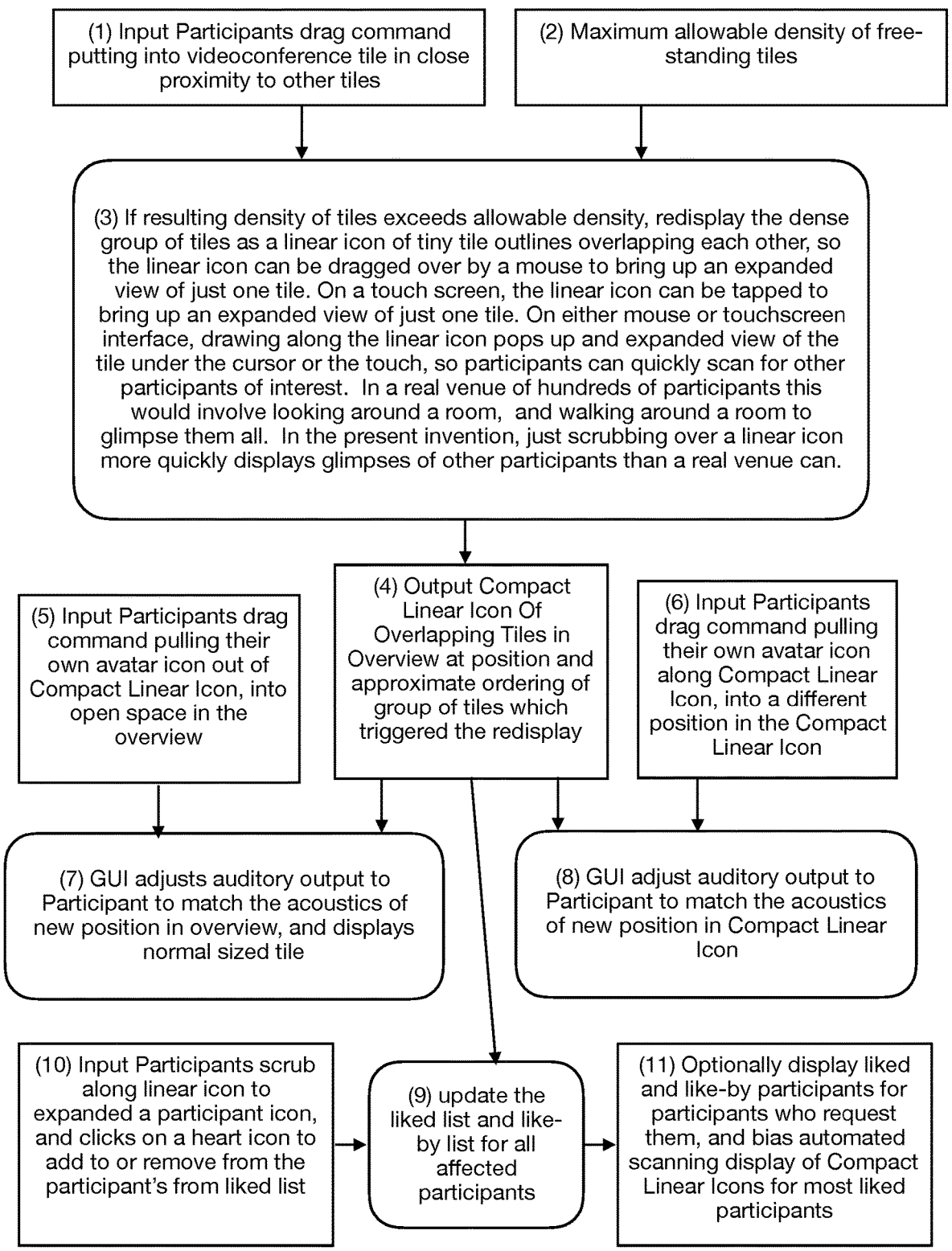
FIG. 19 shows a Method Of Automatically Displaying Overlapping Tiles.

For other participants, not just clicking but also dragging along the linear icon reveals, one by one, in expanded size, the avatar tile represented by each trapezoidal outline. This dragging creates an effect of "scrubbing" through a set of frames from a film, or flipping through a set of cards, to quickly scan the set of participants represented by the linear icon. So when a particular avatar appeals to a participant, they can drag down to the heart-shaped "like" icon in the avatar frame, and click on it to add that participant to their personal "liked" list. This selection method is detailed in FIG. 19.

For a large concert, having a personal "liked" list for each participant supports the kind of person-to-person interactions where concert goers get interested in each other. Sometimes that interest goes both ways, sometimes not, but these levels of interest change how participants want to view the venue: they'd rather view the participants they are most interested in, and by "liking" these participants of interest, the GUI can automatically show expanded size avatar tiles for these participants, either by leaving them popped open as with Anna in FIG. 16, or connected to the linear icon by a dotted line with arrowhead, pointing to Dana in FIG. 16, to show that Anna had "liked" Dana. In this way, a participant can always keep an eye on the participants they are most interested in, among the hundreds or thousands compressed into linear icons of a large concert.

In FIG. 16, a dotted line with arrow pointing from Jesse to Anna shows that Jesse has "liked" Anna. if Anna were to return this gesture, there were be another line pointing from the avatar for Anna to the avatar for Jesse, and at that point, Jesse might attempt to drag his icon next to Anna in the linear icon, to have a semi-private or private conversation with her. If she wants to rebuff this advance, she can drag him away from her, and from then on, he will be "bounced" away from her on further attempts, until and unless she changes her mind by dragging her icon onto his icon, as shown by the method of FIG. 14.

Figure 17:
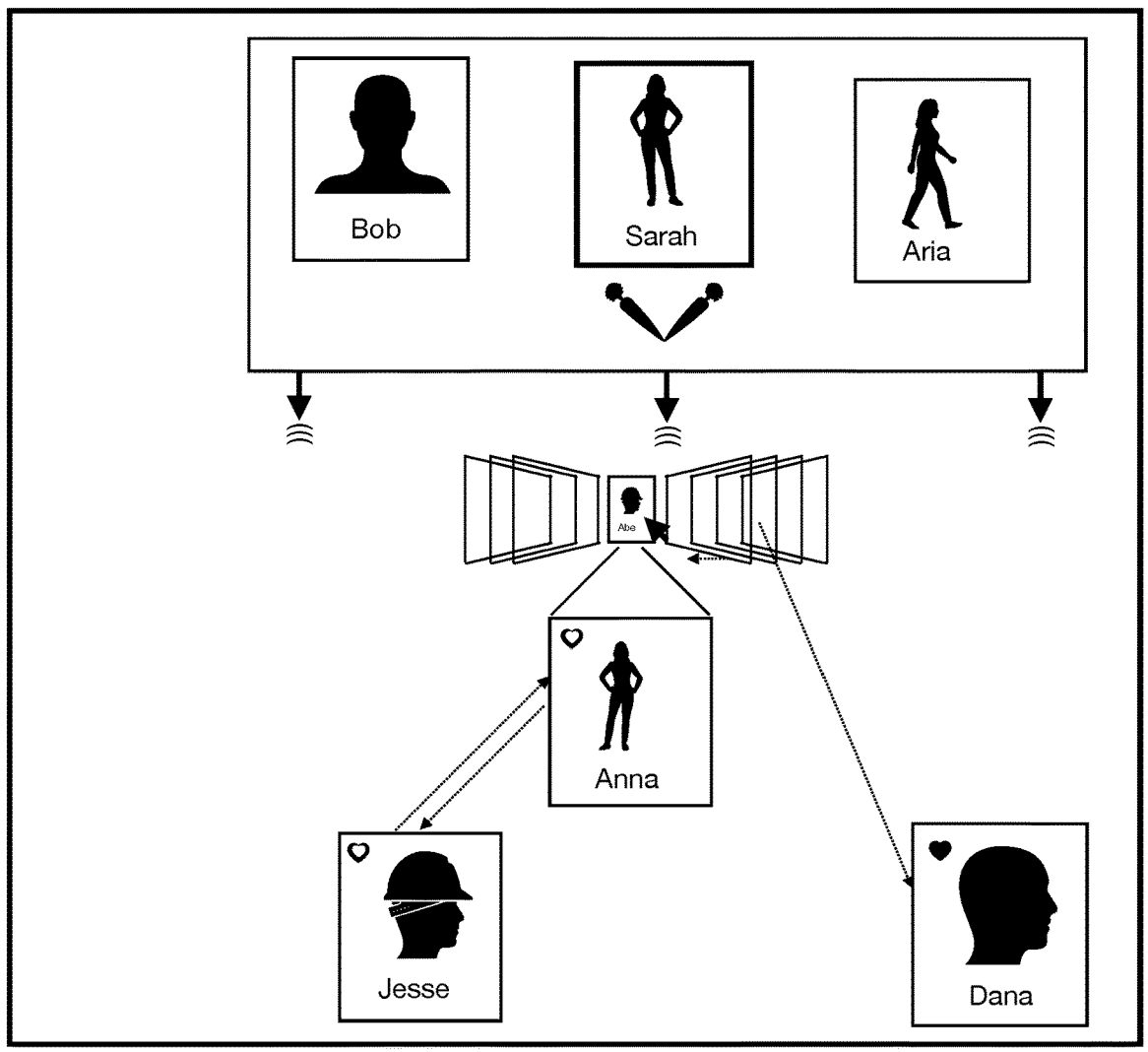
FIG. 17 shows an example Of Displaying Overlapping Tiles In Less Crowded Overviews.

FIG. 17 shows an alternate version of a linear icon, where the trapezoids are large enough to allow a small thumbnail of an avatar tile to appear between trapezoids, as a way to clarify the fact that avatars are stashed inside the linear icon. The position of Anna in FIG. 17 is slightly to the left of Anna in FIG. 16, and in some variation of the present invention, this can result in an auditory feed which is biased more to that side of the stage, so audience participants can choose which part of the stage they most want to hear. In other variations of the present invention, this choice can also reveal hidden video feeds from those ends of the stage, for instance, side cameras on the same stage performer participants they chose to be close to (not shown).

FIG. 17 also shows double dotted lines between Anna and Jesse and Jesse and Anna, indicating that they "liked" each other, which was mentioned as a possibility for FIG. 16. FIG. 17 also shows a line from the linear icon to an avatar icon for Dana, showing that Anna has "liked" Dana as well. If many, many participants "like" Anna, then the many avatars of these fans of hers would have to be shrunken in size and parked along the edges of the main overview for Anna (not shown). Other participants, however, would not see all these links to avatars. In some versions of the present invention, they would see automatic scans of the linear icons, which periodically flip thru them to pop-up the avatars in the compacted trapezoids, one-by-one. The hang time for these scanned avatars can be automatically weighted to favor participants with the most likes, so that the most "interesting" participants enliven the show given by the automatic scans, as described by the method of FIG. 19 in step (11). It must be understood that the trapezoids drawn here are for patent office drawing requirements, and in practice, far prettier linear icons will be used, similar to those found in timeline scrubbing objects of video display graphical user interfaces, similar to the scrubbing objects of Apple's Photos applications, or DaVinci Resolve's color grading application.

Figure 18:
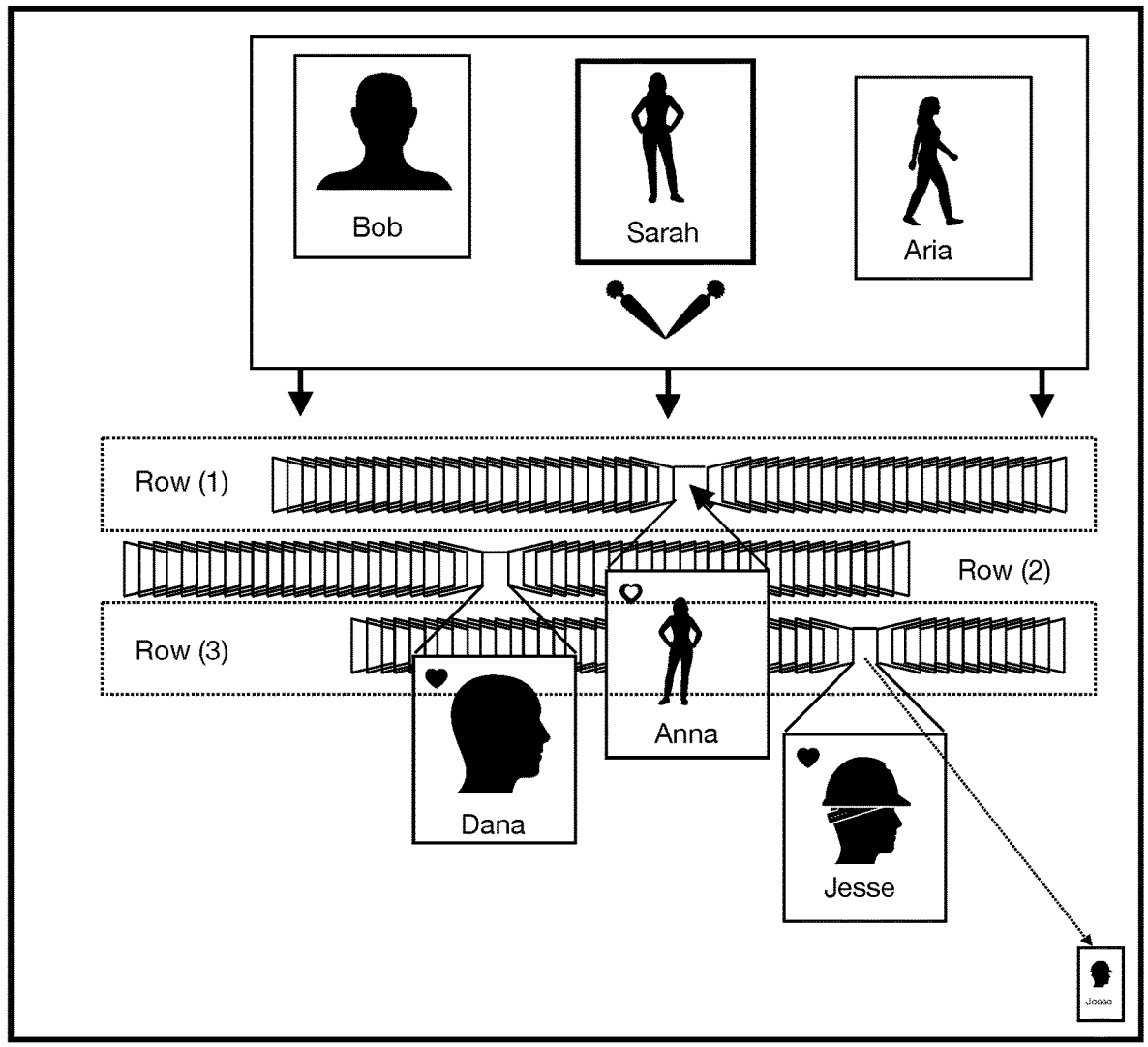
FIG. 18 shows an example Of Displaying Overlapping Tiles In A Packed Venue.

FIG. 18 shows a crowded version of the venue of FIG. 16, with three rows of linear icons to compact over 130 compacted avatar tiles, with three tiles, for Dana, Anna, and Jesse, popped open to show their video feeds. An alternate smaller avatar tile for Jesse is shown in the lower right corner with a dotted line back to Jesse's position in the linear icon, in case there is not enough room to show Jesse popped up directly adjacent to the linear icon in which Jesse is positioned.

Each of the three rows of linear icons is labelled Row (1), Row (2) and Row (3). In some variations of the present invention, tickets can be sold assigning participants to individual rows, so rows in the back could be less expensive, since they offer less options to reposition oneself relative to the performers on-stage. In other variations of the present invention, the linear icons can be curved as rows of seats in amphitheaters are often curved, to fit larger audiences around smaller stages. When curved, the scrubbing gestures to pop up the avatars icons would also follow those curves.

Figure 21:
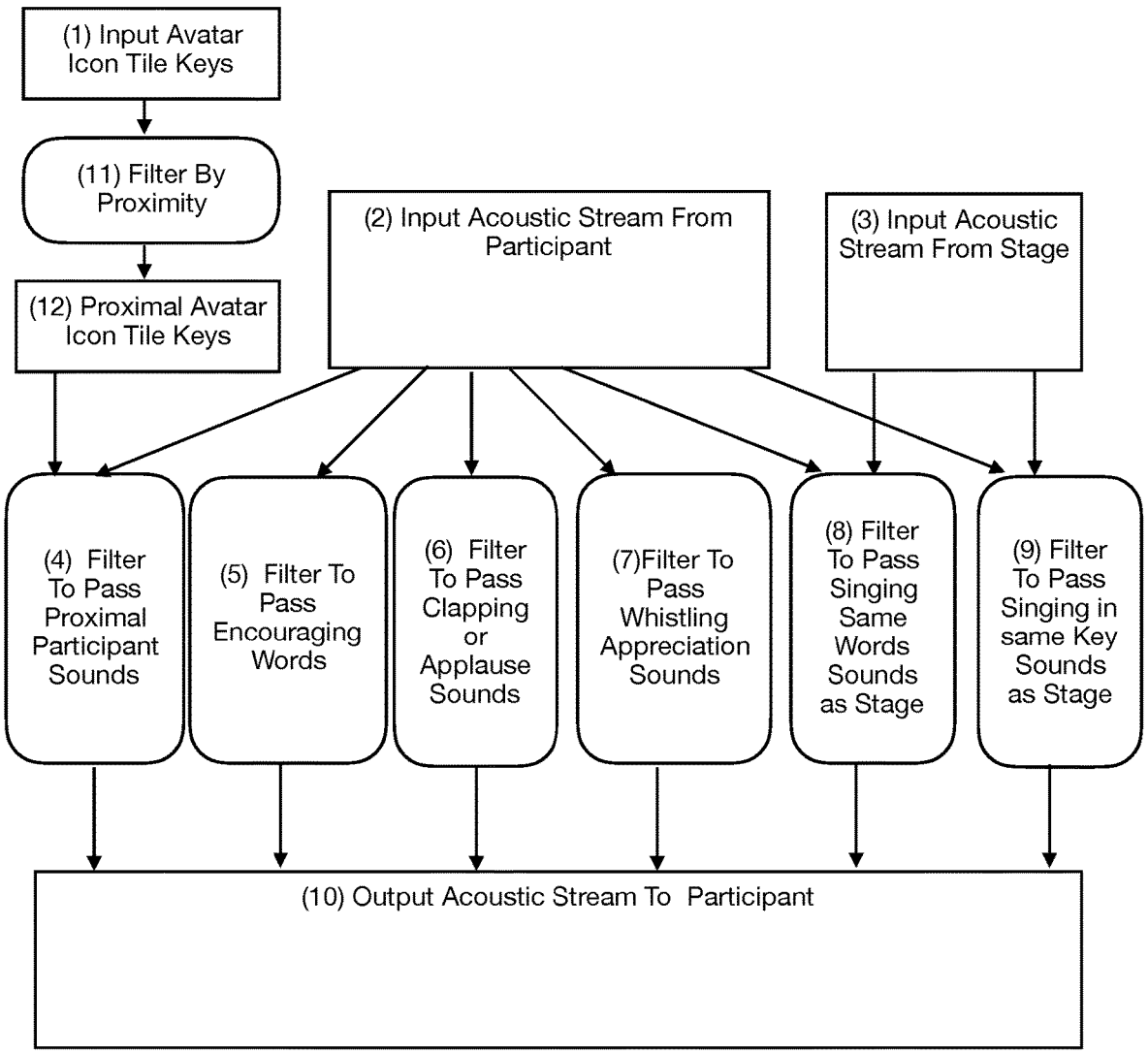
FIG. 21 shows a Method Of Modeling Crowd Acoustics In A Packed Venue.

From FIG. 18, it's possible to see that a large 4K resolution display could hold large audiences of participants compressed into trapezoids, as many as 5 to 10 thousand trapezoids. In these larger audiences, the effects of excited crowds and the ambiance they project can make performances much more interesting. To support crowd-to-performer interactions, the present invention has methods to model crowd acoustics, primarily by focusing on the positive audio feedback that individual participants may give to performers in the method of FIG. 21. In this simulation method, filters passing only positive feedback such as clapping, whistling and encouraging words merge this approved output streamed to all participants. For audience participation sounds, which also enliven performances, other filters using speech recognition can pass along words sung matching the words sung on stage from (3) Input Stream from Stage. And for additional audience participation sounds, (9) Filter passes along singing detected as singing in the same key as Sound from Stage. Together, these higher quality audience participants sounds can boost the level of excitement felt from a performance, and as a practical matter, reduce the spurious sounds occurring in a prior art venue which may interfere with or degrade the clarity of sound from the performers on stage. In some variations of the present invention, the audience sounds can be binaurally output to participants, so they sound like they are coming from locations of the participants which produced them, thus to realistically localize them within the context of the venue overview shown to all participants.

Figure 22:
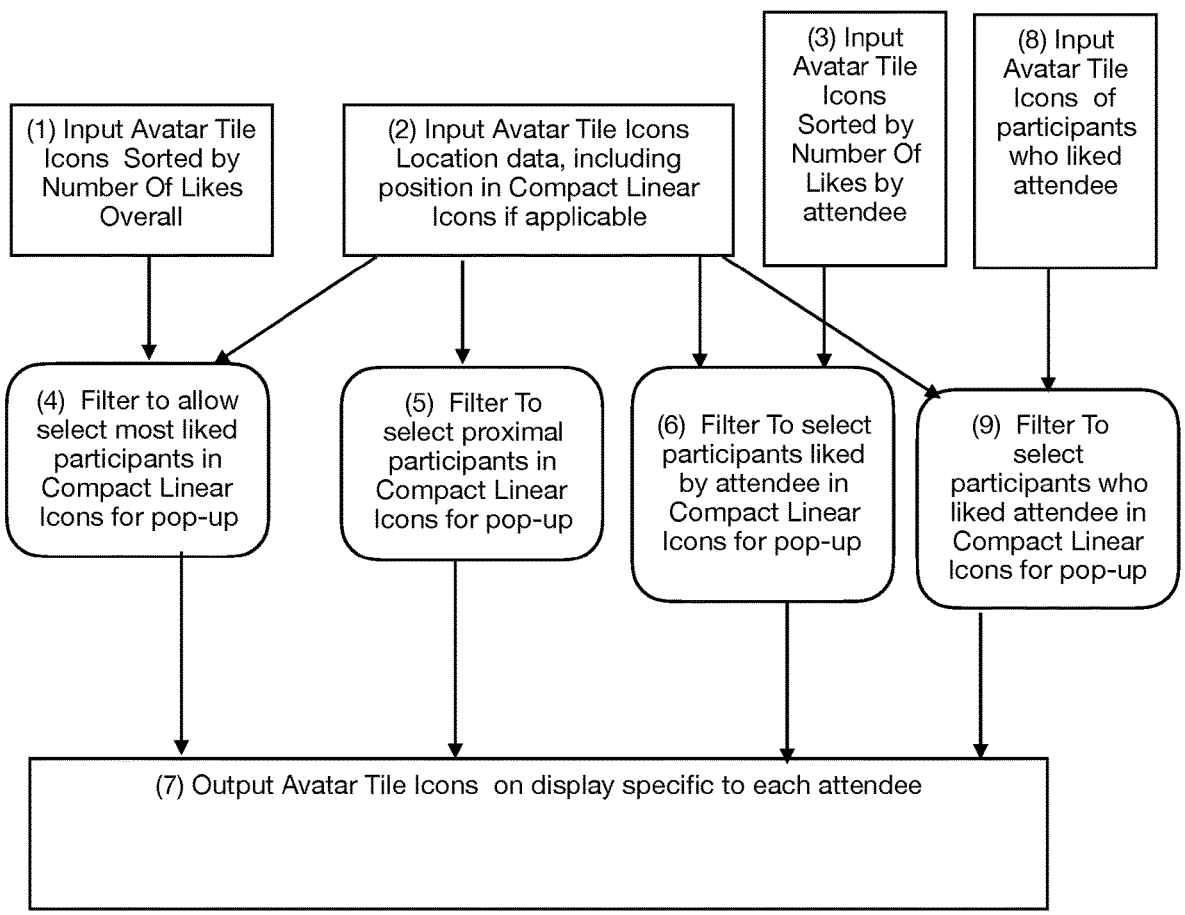
FIG. 22 shows a Method Of Displaying Avatar Tiles In A Packed Venue to Attendee.

FIG. 22 shows a method to publicize the most liked avatar video feeds within the venue, by relying on the number of likes each participant has received from other participants. For all participants, the automatically scanning of linear icons to briefly reveal individual avatar icons is bias for greater display hang time for the most liked participants, to increase interest in event participants. For each participants, their personal liked list expands the avatar icons of the participants they liked, so the can enjoy seeing them as expanded continually without having to do further gestures in the GUI. The display of which participants have liked an attendee suggests that the attendee consider approach these participants who liked them. Together, these features enable a venue to be more socially active and interesting for meeting participants.

In all, the present invention provides significant and much needed improvements in person-to-person interactions in videoconferencing venues, to achieve most of the human to human interactions which they'd like to achieve in prior art videoconferencing, but cannot achieve because prior art videoconferencing does not improve the freedom the move around acoustic architectures and change acoustic perspectives based on their relative positions to other participants. Recent advances in processing power and simulation of binaural sound from monophonic sound, simulated distances and azimuth angles as well as aural anatomical comb filtering effects can increase the power of these freedoms within simulated aural spaces in videoconferencing.

I claim:

1. A computer-implemented user interface method adjusting the acoustic transmissions between videoconference attendees, distributing the control of these adjustments to individual attendees to increase venue scalability by reducing host intervention labor, wherein an attendee may choose to drag their avatar icon to overlap another attendee avatar icon to automatically create a private acoustic zone of conversation around both attendees, and wherein a first attendee in the private acoustic zone of conversation may subsequently choose to drag a second attendee icon away from the private acoustic zone of conversation to automatically eject the second attendee from the private acoustic zone of conversation.

2. The method of claim 1 wherein the ejected second attendee may subsequently choose to drag their own avatar onto the first attendee avatar again, which automatically causes a bouncing of the ejected attendee back to their prior position outside the private acoustic zone of conversation, thus automatically preventing ejected attendee from re-entering the private acoustic zone of conversation.

3. The method of claim 1 wherein the first attendee may choose to drag the avatar of the ejected attendee back onto the first attendee avatar to automatically cancel the prior ejection of the ejected attendee from the private acoustic zone of conversation, and to automatically reinstate the ejected attendee in the private zone of conversation.

4. The method of claim 1 wherein an acoustic zone of privacy containing a first attendee has a multiplicity of second attendees whose avatar icons do not overlap with other second attendee avatar icons, and using a non-commutative privacy calculation, automatically second attendees cannot hear or talk to other second attendees, but first attendee can hear and talk to each of the second attendees.

5. The method of claim 1 wherein acoustic transmissions between videoconference attendees are filtered for positive audience feedback or audience participation sounds to be transmitted to all participants, including participants who would otherwise not hear these sounds.

6. The method of claim 1 wherein a multiplicity of videoconference attendee avatar icons are reduced in size and detail and placed adjacent to each other to squeeze more icons into the user interface, so attendees can scan through a larger multiplicity of avatar icons, to display a popped out subset of them at full size by moving a cursor or pointing device along the multiplicity of reduced size icons.

7. The method of claim 6 wherein full sized versions of reduced size icons can be popped out and dragged away from selected reduced size icons, to keep selected attendee icons displayed as full size versions.

8. The method of claim 6 wherein attendees can click on buttons to indicate they have interest in other specific attendees, and this indication of specific interest is displayed to the attendees they are interested in, either by showing the interested attendee's name or other personal identifiers.

9. The method of claim 1 wherein activation of a private zone of conversation is indicated as a halo around avatar icons of the attendees which are in the private acoustic zone of conversation.

10. The method of claim 1 wherein a dragging on the tile overlap areas of a private acoustic zone of conversation drags both of the tiles of the overlap area in unison.

11. The method of claim 1 wherein instead of dragging an avatar icon onto another avatar icon to activate a private acoustic zone of conversation, the attendee just drags an avatar icon up to another avatar icon to activate a private acoustic zone of conversation.

* * * * *